United States Patent [19]

Buchanan et al.

[11] Patent Number: 5,148,366
[45] Date of Patent: Sep. 15, 1992

[54] COMPUTER-ASSISTED DOCUMENTATION SYSTEM FOR ENHANCING OR REPLACING THE PROCESS OF DICTATING AND TRANSCRIBING

[75] Inventors: Ken Buchanan, Eagan; John A. Dowdle, St. Paul, both of Minn.

[73] Assignee: Medical Documenting Systems, Inc., St. Paul, Minn.

[21] Appl. No.: 422,139

[22] Filed: Oct. 16, 1989

[51] Int. Cl.$^5$ .................. G06F 15/00; G06F 15/20
[52] U.S. Cl. ................... 364/419; 395/600
[58] Field of Search ............ 364/419, 900, 943, 943.1, 364/943.5, 957, 222.81, 222.82, 225.6; 340/712

[56] References Cited

U.S. PATENT DOCUMENTS

| | | | |
|---|---|---|---|
| 3,872,462 | 3/1975 | Lemelson | 340/324 |
| 3,934,226 | 1/1976 | Stone et al. | 340/172.5 |
| 4,348,744 | 9/1982 | White | 364/900 |
| 4,491,725 | 1/1985 | Pritchard | 235/375 |
| 4,591,974 | 5/1986 | Dornbush et al. | 364/200 |
| 4,794,386 | 12/1988 | Bedrij et al. | 340/724 |
| 4,835,690 | 5/1989 | Gangarosa et al. | 364/413.13 |
| 4,839,822 | 6/1989 | Dormond et al. | 364/513 |
| 4,959,769 | 9/1990 | Cooper | 364/200 |
| 4,962,475 | 10/1990 | Hernandez | 364/900 |

FOREIGN PATENT DOCUMENTS 0216063  4/1987  European Pat. Off. .

OTHER PUBLICATIONS

Eugene G. Principi "Better care, shorter stays, thank to networking" Nov. 1986.
Korpman "Patient Care Information Systems: Looking to the Future" 1985.
Nursing Economics, Michelle Mowry 1987 "Evaluating Automated Information Systems" and Automated Information Systems in Quality Assurance.
"Doctor Office Manager: An IBM Billing Package" Matthew Cushing, Jr. M.D. 1985.
AFIPS Conference Proceedings, 1984 National Computer Conference, Las Vegas, Nevada, U.S., Jul. 9–12, 1984, AFIPS Press, (Reston, Virginia, U.S.) J. Sprowl et al.: "An Expert System for Drafting Legal Documents".
IBM Technical Disclosure Bulletin, vol. 21, No. 11, Apr. 1979, (Armonk, New York, U.S.), R. J. Gerlach et al.: "System for Simplified Form Fill–in Using CRT Display".

Primary Examiner—Gail O. Hayes
Assistant Examiner—Andrew Bodendorf
Attorney, Agent, or Firm—Merchant, Gould, Smith, Edell, Welter & Schmidt

[57] ABSTRACT

A document generation system is provided for enhancing or replacing the dictation and transcription process. More particularly, a computer-based documentation system utilizing a document structure manipulated by a user interface is provided. The document structure or "boiler plate" includes phrase fields containing user-definable phrases and option-text fields. The option-text fields include a plurality of option-text segments. Through the use of the user interface, desired modifications to the user-modifiable phrases and option-text segments can be accomplished. The user interface further enables selecting of at least one option-text segment from within an option-text field. Subsequently, the system generates a document comprising at least one user-definable phrase and at least one selected option-text segment.

31 Claims, 11 Drawing Sheets

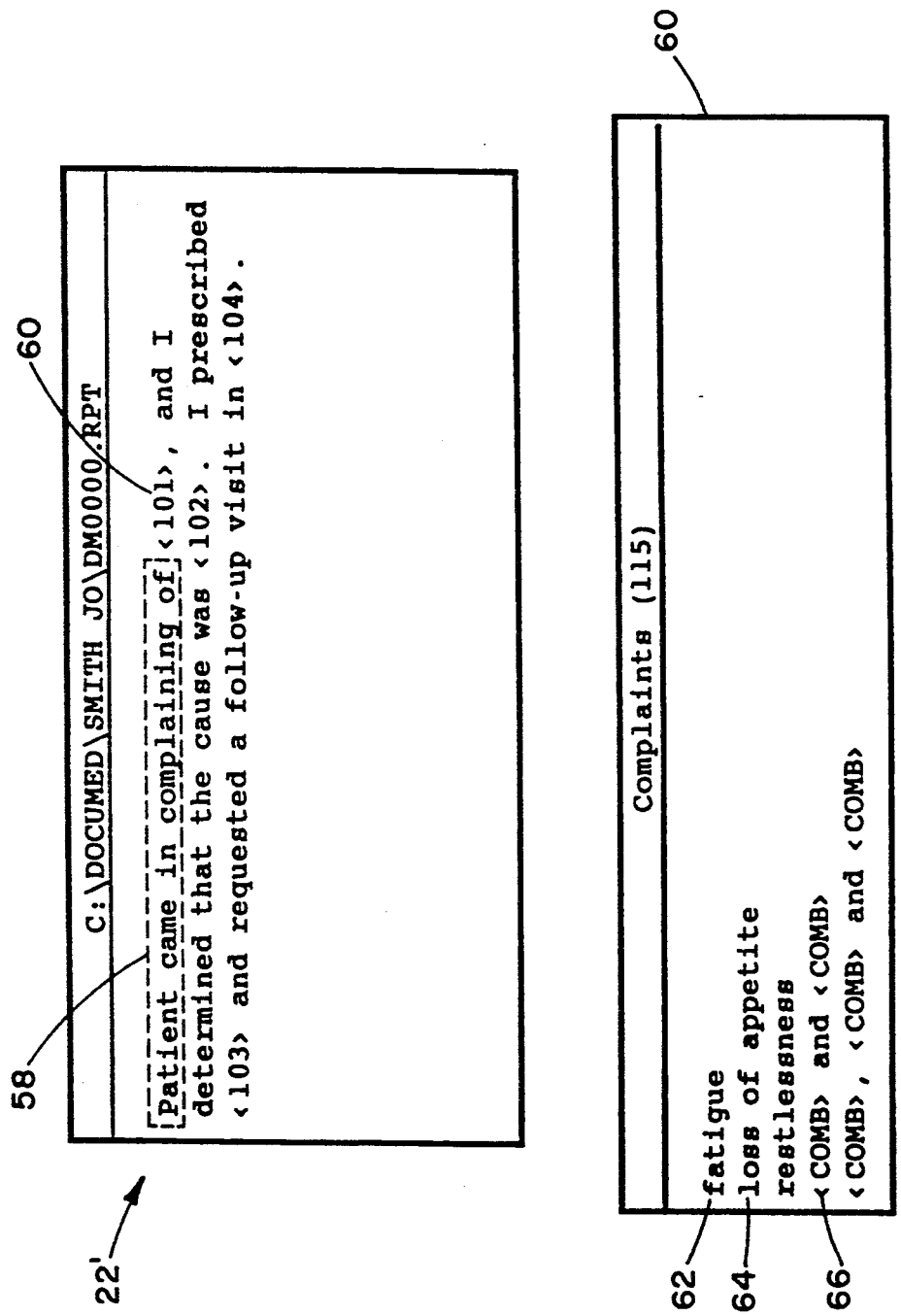

Jan 1, 1989         DocuMED 1.0              11 37 AM
    Control    Document    Report    Format    Locate    Print Enter Patient Information Last name          First name       MI       Title      ID Number Street 1
Street 2
City                                         State            Zip Home Phone                                   Work Phone Height    Weight      Age       Sex          Married Occupation
Employer Health Insurance Company
              ID #

Comments

F2 = Clear    F5 = Accept    ESC = Abandon

FIG. 8

```
Jan 1, 1989          DocuMED 1.0              11 37 AM
       Control   Document   Report   Format   Locate   Print
                 C:\DOCUMED\SMITH_JO\DM0004.RPT Present Symptoms:  The patient is seen <#44> with low back pain.
The pain is described as <169> and appears to be <412>.
At its best, the pain is desc┌──────────────┐rst, the pain is
described <413>.  The worst t│ Date of Today│pain is <171> and
the best time of the day is <│              │ion for sitting
is <175> and the maximum for │A. <DATE>     │patient sleeps
about <178>.  The following de│B. <KBD>     │ain response to
various activities and functions:
                              └──────────────┘

Activity/function                Response sitting                         <161>
            prolonged standing              <162>

┌─────────────────────────────────┐
                    │                                 │
                    │     Manual entry -->            │
                    │                                 │
                    │                                 │
                    └─────────────────────────────────┘
    File:

RPT: Present Symptoms   PAT: Jones, John J.   USER: Smith
```

FIG. 9

COMPUTER-ASSISTED DOCUMENTATION SYSTEM FOR ENHANCING OR REPLACING THE PROCESS OF DICTATING AND TRANSCRIBING

BACKGROUND OF THE INVENTION

The present invention relates to document generation systems and, more particularly to a system incorporating user-modifiable document structures or "boiler-plates", a database including information to be placed into a particular document structure, and a computing device which combines the particular document structure with relevant information stored in the database to form a document.

Traditionally, the practice of dictating and transcribing has been used to record information related to interviews, personal reminders, thoughts on a subject, and drafts or letters of other documents. In the service industries, such as consulting, legal and medical fields, professionals have been increasingly burdened by the need to document every encounter with clients or patients. This is particularly true in the medical field where physicians must record information about each patient office visit, diagnosis, suggested treatment and prescription given. In addition to recording patient information, physicians must fill out forms for submission to insurance companies and provide information to regulatory agencies. To gather and produce all of this information, physicians must spend a significant portion of their work day dictating the needed information for each record or form. Further, a physician must maintain a staff to transcribe the information into reports and to fill out required forms.

A physician typically dictates a report on each patient encounter which, subsequently, must be typed by a transcriptionist. The process is time consuming and repetitive. For this reason, shortcuts are often taken causing reports to be incomplete. As a result, potential legal and insurance problems as well as reduced quality of patient care can occur. Using traditional manual methods of record keeping, patient data is not readily available for fast and easy review. A patient's medical record cannot be easily combined with other reports or other patient data for analysis and reporting.

In response to the above-mentioned needs and problems encountered in the medical field, the present invention was developed. The present invention automates the documentation process by providing a computer-based documentation system incorporating a relational database with a multi-document word processor preferably comprising a graphics engine within a menu-driven, graphic window environment. The documentation system utilizes previously defined document structures or "boiler-plates" to manage patient reporting. A document structure offers a framework within which certain items will vary.

For instance, an initial exam conducted by an orthopedic surgeon will contain many basic elements common to all patients, but response to the exam will vary for each patient. A report to be input can contain any number of variable responses, and each variable within the input report can offer any number of different options from which to choose. In addition, a physician can personalize the report, modifying or creating new documents to suit a particular situation. Further, while generating a particular document, a physician can customize the document by inserting words into the generated document through the use of the integrated word processor.

In an alternative embodiment, the physician can avoid directly using the documenting system by utilizing printed checklists. After a checklist has been filled out by a physician, another individual can generate the desired documents from items checked off on the checklist.

The data input into the documenting system is electronically stored for possible future use in reporting and/or analysis. The future uses may include graphical analysis, cost accounting, time reporting and other desired document generation.

It will be appreciated by those familiar with the art that such a document generation system can be utilized in a plurality of environments including medical, legal, government, insurance and other service or document generating environments. In the legal field, simple contracts, licenses or agreements could be drafted in this manner. In the government, routine status reports, procurement requests or inspection reports could be produced by such a system. In the insurance field, insurance applications could be processed, policies maintained, or claim reports prepared. These and other possible areas of use of the present invention will become apparent after reading the following detailed description.

SUMMARY OF THE INVENTION

A document generation system is provided for enhancing or replacing the dictation and transcription process. More particularly, a computer-based documentation system utilizing a document structure manipulated by a user interface is provided. The document structure or "boiler plate" provides a template useful for the generation of a document, it includes phrase fields containing user-definable phrases and option-text fields. The option-text fields store pointers to option-text expressions including option-text segments. Through the use of the user interface, desired modifications to the user-modifiable phrases and option-text segments can be accomplished. The user interface further enables selecting of at least one option-text segment from within an option-text field. Subsequently, the system generates a document comprising at least one user-definable phrase and at least one selected option-text segment.

BRIEF DESCRIPTION OF THE DRAWINGS

FIG. 5 is a drawing showing an example of a preferred embodiment linked user-modifiable document structure.

FIG. 6 is a drawing showing an example of a preferred embodiment user-modifiable option-text field.

FIG. 8 is a drawing showing a preferred embodiment example data structure which may be utilized to enter specific patient information.

FIG. 9 is a drawing showing a preferred embodiment example of selecting an option-text segment comprising a user-definable text-note and subsequently the automatic activation of a single line editing mode so that a single line of customized text can be entered into the database.

DETAILED DESCRIPTION

Figure 1:
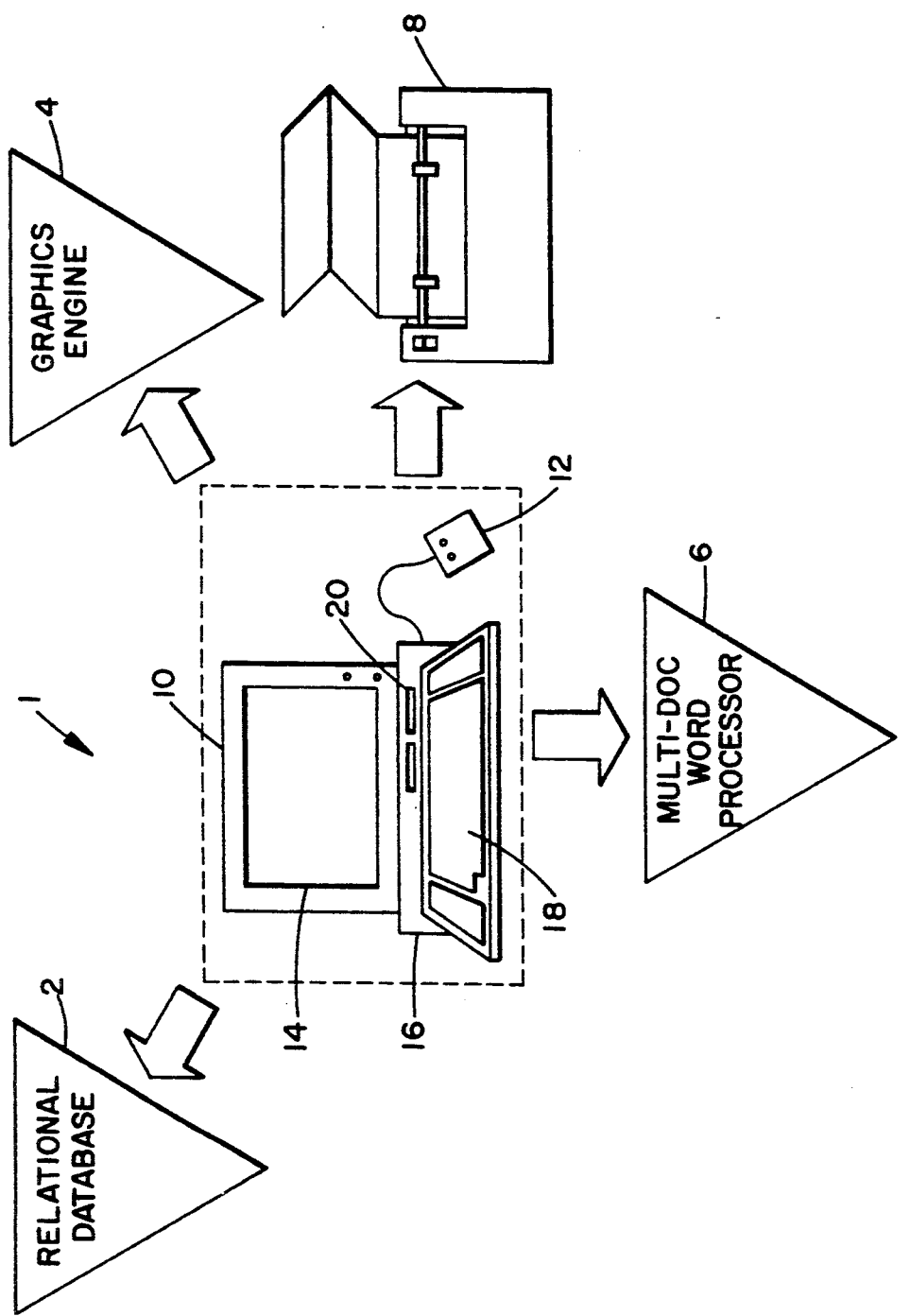
FIG. 1 is a diagram showing a preferred embodiment of the document generation system.

Shown in FIG. 1, is a diagram of a preferred embodiment document generation system. The preferred embodiment document generation system 1 comprises a computing device 10, relational database 2, and multi-document word processor 6. In an alternative embodiment, the document generation system 1 further includes an output device such as a printer device 8.

The computing device 10 preferably comprises an electronic display 15, a data processing device 16, and a keyboard 18. The computing device 10 further includes an electronic storage device 20 for storing information from the relational database 2. Electronic storage device 20 can be any device capable of storing data for long periods of time. For example, electronic storage device 20 could be a floppy disk drive, Bernoulli hard drive, Winchester hard disk, analog tape drive, digital tape drive, optical disk drive. It will be appreciated by those in the art that new or improved electronic storage devices can be utilized by the present invention as they become available for use. In an alternative embodiment, the computing device 10 further includes a pointing device 12. The pointing device can be utilized by the document generation system 1 as an alternative input device. The pointing device may comprise a mouse, trackball, light pen, bar-code scanner or digitizing pad.

Figure 2:
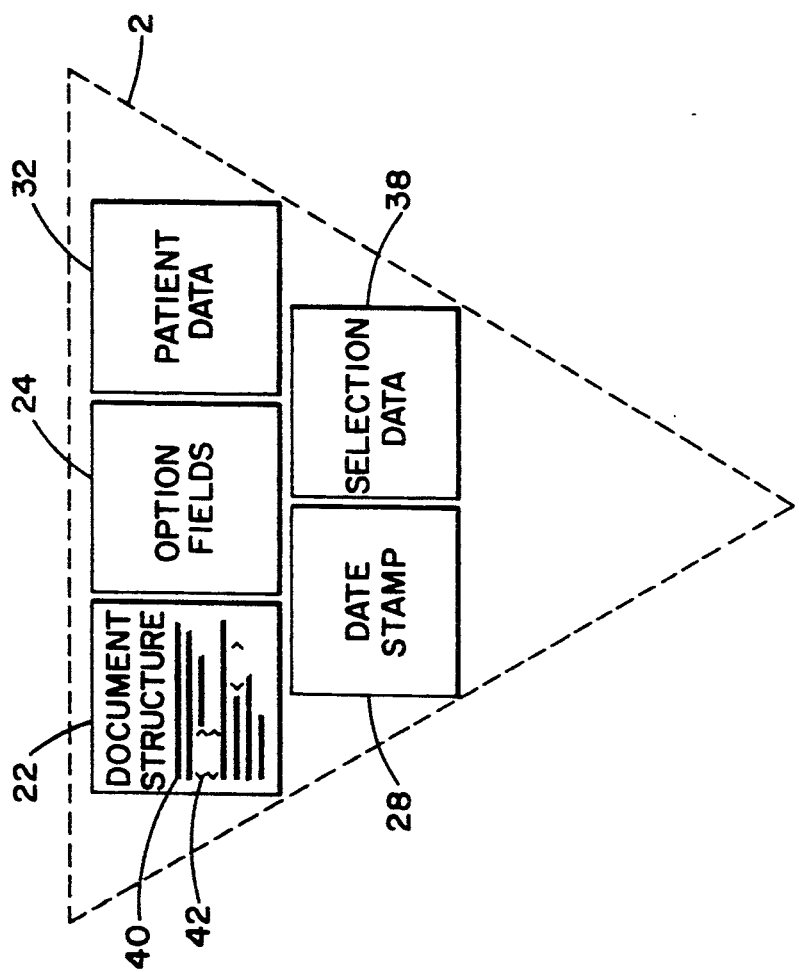
FIG. 2 is a diagram showing the contents of the preferred embodiment relational database.
Figure 3:
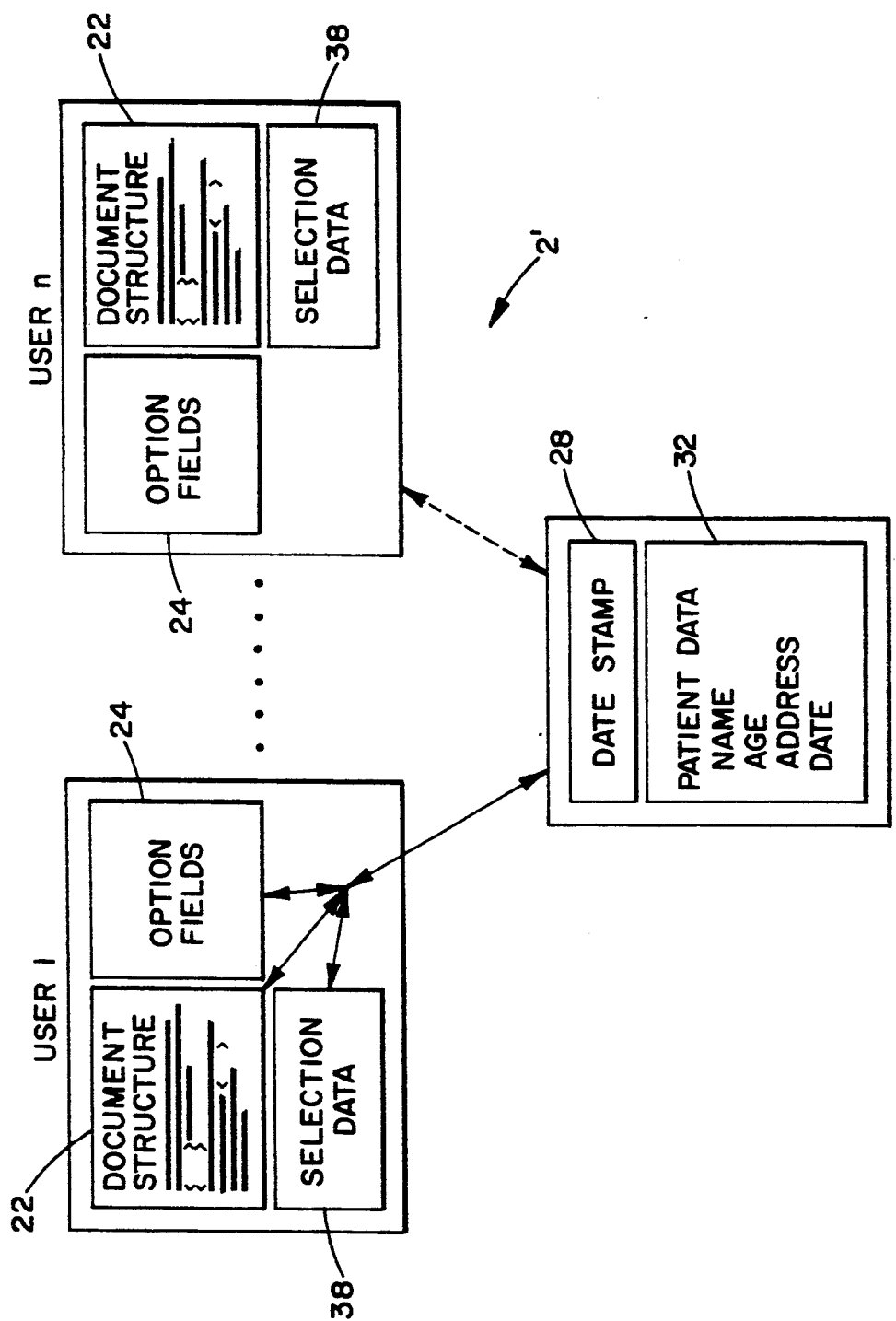
FIG. 3 is a diagram showing an alternative embodiment of the document generation system in which the relational database shares stored information with more than one user.

In the preferred embodiment, relational database 2 comprises a user-definable electronic document structure 22 shown in FIG. 2. The user-definable document structure 22 comprises a plurality of phrase fields 40 which electronically store user-definable phrases and further comprises an option-text field for electronically storing a plurality of user definable option-text segments.

In an alternative embodiment, the option-text segments further comprises a plurality of data pointers which point to previously stored text which is electronically stored in an option list 24. The relational database 2 further comprises patient data 32 which includes specific information about a particular patient which may be needed to produce a plurality of different documents derived from a plurality of different document structures 22. The preferred option-text field further comprises a plurality of data pointers which point to particular data segments within stored patient data 32.

The relational database 2 preferably further comprises selection data 38. Preferred selection data 38 includes information concerning selections of different option-text segments within a particular document structure 32 in combination with a particular set of patient data 32 and a date stamp 28. The relational database 2 in combination with the data processor 16 further preferably includes a date stamp 28 function. The date stamp 28 function allows the relational database 2 to determine the data and time that each document structure 22, option list 24, patient data 32, or selection data 38 was created or modified. It will be appreciated that relational database 2 may be configured in a variety of different structures and the description above is merely one example of one such structure.

The computing device 10 in combination with the multi-document word processor 6 and relational database 2 provide a user interface for utilizing the document structure 22 to generate a document. The multi-document word processor 6 provides an editing environment for making user modifications to the user-definable phrases and user-definable option-text segments within the option-text fields 42. Interaction of the electronic display 14, data processing device 16 and keyboard 18 provide a selecting function for selecting at least one user-definable option-text segment within an option-text field. This selecting may be accomplished by depressing key actuators on keyboard 18 which indicate the selection of a particular user definable option-text segment. In an alternative embodiment, movement of a pointing device 12 in combination with activating pointing activator accomplish the selecting function. The elements of the user interface further combine to provide a document generation function which generates a document comprising at least one user-definable phrase and at least one selection option-text segment of an option-text field.

In an alternative embodiment, document structure 22 preferably includes a user-modifiable electronic link between a phrase field and an option-text field. In addition, the document structure 22 preferably includes a user-modifiable electronic link between a first and second phrase field. Those skilled in the art will recognize that such links may be formed in various manners including, for example, the use of data pointers which point to the following element which is to be linked, the use of lookup tables, or B-tree data structures. Further, the multi-document word processor 6 typically provides an editing environment for making user modifications to the links between a phrase field and an option-text field as well as between a first and second phrase field. The elements of the user interface typically further combine to provide a document generation function which generates a document comprising a phrase field linked to an option-text field. Similarly, the document generation function may generate a document from the linked first and second phrase fields.

In an alternative embodiment, a multi-user system partitions relational database 2 into a plurality of parts. The multi-user system includes user specific document structures 22, option lists 24 and selection data 38. In addition, particular information may be stored such that more than one user can access the particular information. Such information may include date stamp 28 and patient data 32. In this alternative embodiment, each user may have access to the shared information for use in generating a document and may define specific document structures incorporating available data in a manner which seems appropriate for the particular document desired. For instance, such a multi-user system might be used in a hospital or clinic wherein a variety of different types of physicians are using document generation system 1. An orthopedic surgeon and a gynecologist probably would not want to have the same document structure 22 for describing an office visit; however, both physicians may need to incorporate specific patient data including name, age, address, date of birth and insurance provider into a particular report document. Significant cost savings and efficiency can be achieved by sharing this information between various individuals utilizing document generation system 1. At the same time, it is typically necessary to provide flexibility within the document generation system 1 to allow custom documents or reports to be generated for a particular situation. As a result, relational database 2 preferably is partitioned into user specific data and sharable data. Such a configuration can be utilized across a local area network comprising a plurality of computing devices 10 connected to a relational database 2 which has user specific and sharable portions of data.

Security access to stored data preferably is provided by the document generation system 1. Security access may be provided by distinguishing between each user's data and reports through the use of a user name. In the preferred embodiment, the user name is comprised of the first and last name of a user followed by an optional security password. The first and last name are combined to form a pointer to a storage location within relational database 2 which can typically be accessed by a user only after entering his or her first and last name as well as a security password.

Computing device 10 further includes an automatic configuration function in which the data processor 16 automatically senses the presence of an output device and automatically configures to operate with that output device. Such an output device may include electronic display 14 and printing device 8. In addition, computing device 10 preferably includes an operating function in which a user-definable output driver for operating the output device can be defined. Such a user-definable output driver definition function can be particularly important for use in preferred embodiment document generation systems 1 which include a printer device 8 which is not automatically supported and configured to by data processor 16.

The preferred embodiment document generation system 1 further includes a contextual help function in which operating instructions for use of the document generation system 1 can be displayed on electronic display 14 or printed to printer device 8.

Figure 4:
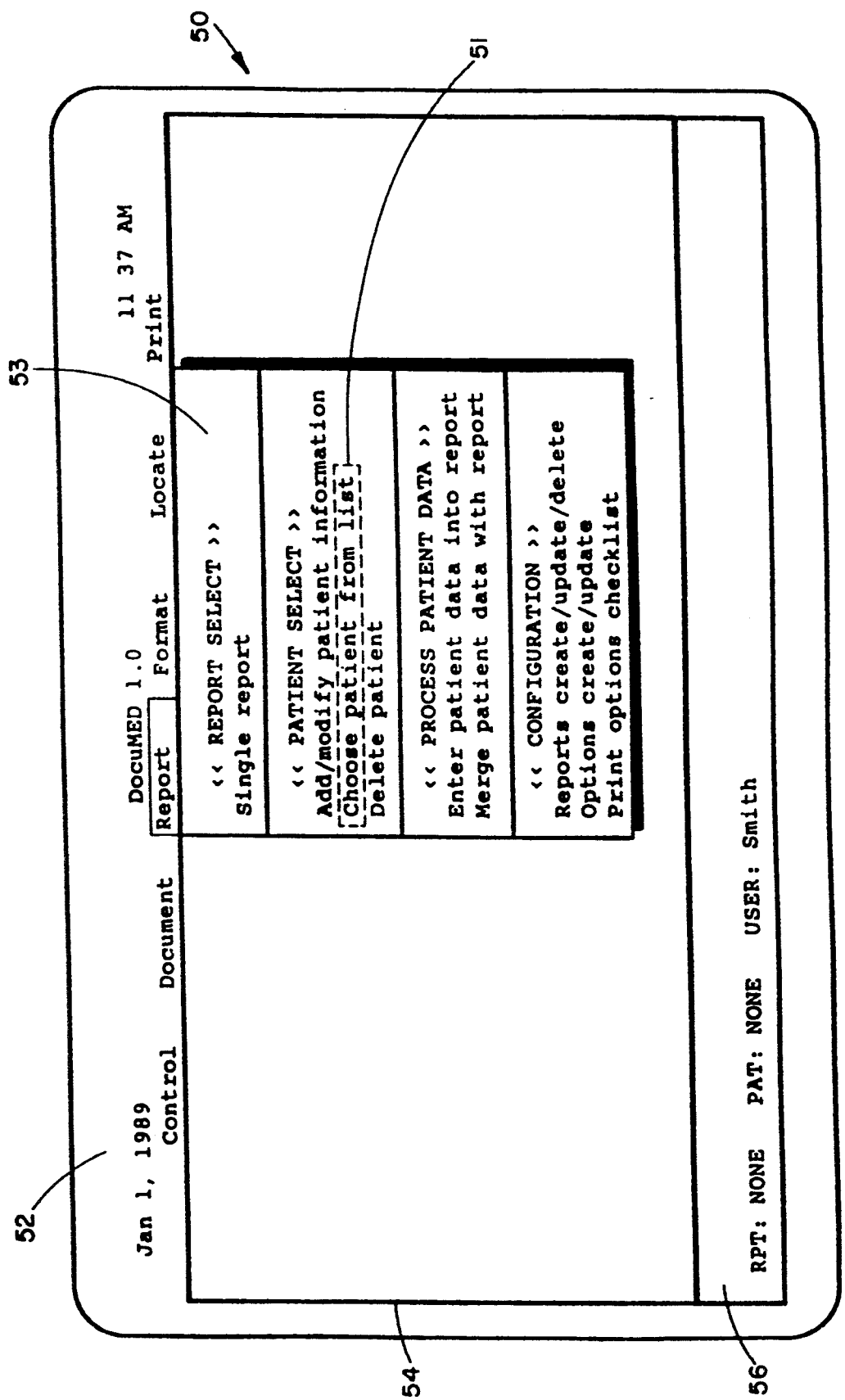
FIG. 4 is a drawing depicting a preferred embodiment menu driven, graphical window environment.

FIG. 4 is a drawing depicting a preferred embodiment menu-driven, graphical windowing environment. This windowing environment of document generation system 1 supports both text and graphics operation modes. A user can choose between the two different modes of operation. In either mode of operation, the appearance and functionality of the document generation system remains substantially consistent. The only limitation is that the use of an alternative embodiment graphics engine typically is not available in text mode operation.

The preferred graphics window environment 50 is divided into three areas. The areas include a top window section 52 which preferably displays the date, time, product name and main menu selections. In addition, window environment 50 includes a middle section window 54 where documents, graphics and dialogue windows can be displayed and manipulated. Further, the graphics window environment 50 includes a bottom section 56 which displays status information for such things as the word processor 6, a generated report, particular selections of report and patients, and keyboard choices.

One of the first steps in using the document generation system 1 is to create a document structure 22. An example of a preferred embodiment user-modifiable document structure 22' is shown in FIG. 5. The example user-modifiable document structure 22' comprises a series of phrase fields linked to option-text fields. For example, phrase 58 is linked to option-text field pointer 60 within example document structure 22'. In the preferred embodiment document generation system 1, a plurality of different reports can be generated for different needs. For example, a physician will probably create a separate report for initial visits and for follow-up visits by a particular patient as well as a separate report for writing a prescription.

After creating a document structure 22, a user typically defines the contents of an option-text field. Shown in FIG. 6 is a drawing showing an example of a preferred embodiment user-modifiable option-text field 60. The example option-text field 60 includes a plurality of user-definable option-text segments 62, 64 and 66. A user can modify the contents of option-text field 60 through the use of word processor 6. Option-text segments 62, 64 or 66 may be inserted into document structure 22 to form a document. By selecting different option-text segments within an option-text field, a user can customize a particular report for a particular patient corresponding to a particular office visit. For example, document structure 22' can be combined with the selection of option-text segment 62 to form a document stating "patient came in complaining of fatigue, . . . ". In the preferred embodiment, the user interface provides the ability to select more than one option-text segment within an option-text field. For example, if the user selects option-text segment 66, the user interface will prompt the user to select two other option-text segments which will subsequently be combined with the document structure 22 when a document is generated.

Figure 7:
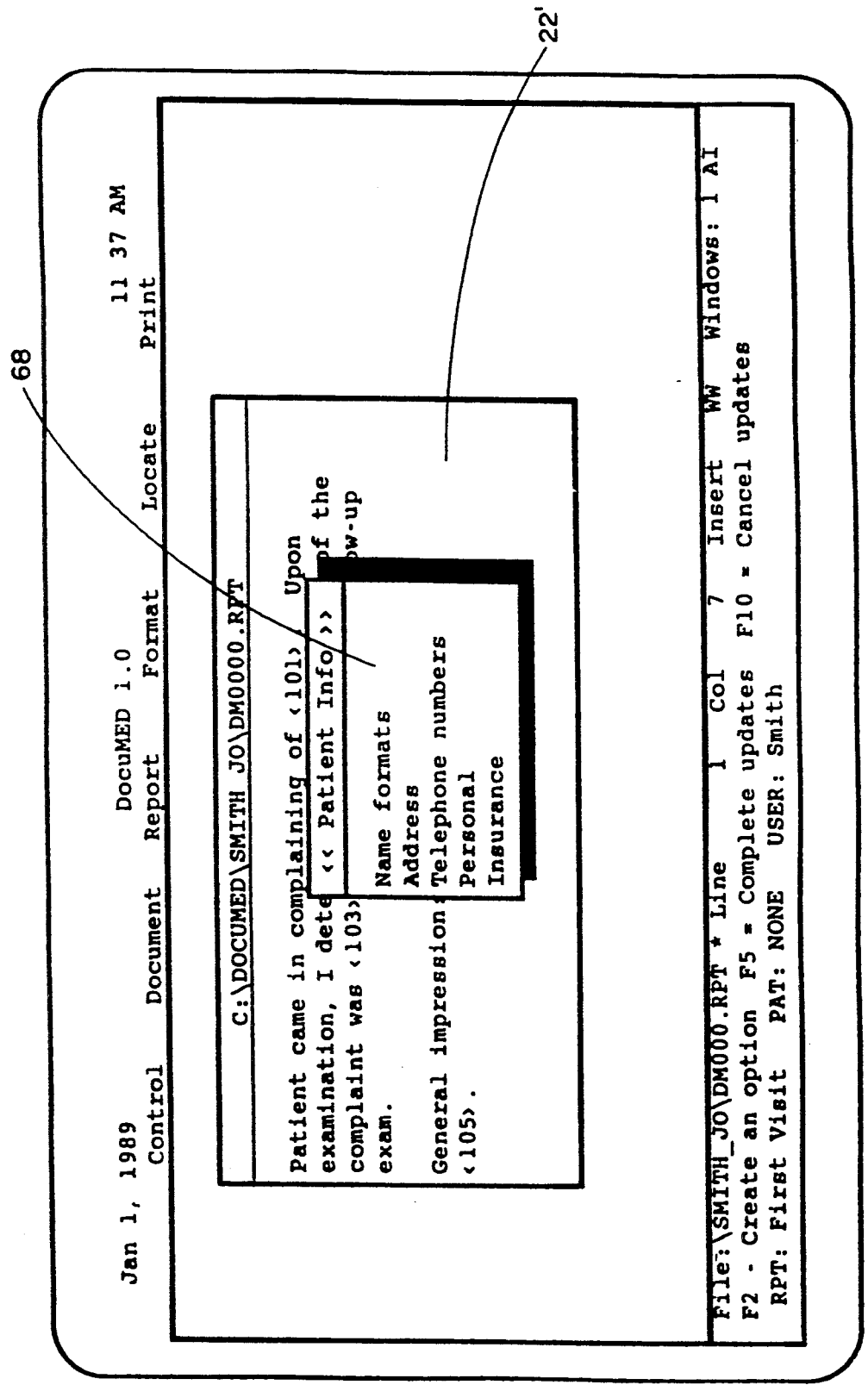
FIG. 7 is a drawing showing a preferred embodiment example of information which can be stored in a patient database and subsequently may be utilized by a plurality of users through the selection of particular option-text segments within an option-text field.

Another typical step in utilizing the document generation system 1 is the entering of patient data into patient data storage portion 32 of the relational database 2. FIG. 7 is a drawing showing a preferred embodiment example of information which can be stored in a patient database 32 within relational database 2. Subsequently, the patient information can be utilized by a plurality of users through the selection of particular option-text segments within the option-text field 68 for insertion into example document structure 22'. The patient specific information could be input into a user-defined document structure 70 shown in FIG. 8. By using patient data document structure 70, the user interface typically will prompt the user for various patient specific information such as last name, first name, middle initial, home phone and health insurance company ID number. After a user enters this information into example patient data structure 70, the information can be stored in relational database 2 in patient data portion 32. Subsequently, such information can be retrieved for use in generating a document comprising option-text segments pointing to information stored within patient data storage portion 32.

After creating suitable document structures 22 and entering patient information into patient data storage portion 32 of relational database 2, a user can generate a set of selection data 38 which can be stored in relational database 2. To create a particular selection data set, a user will first select a particular patient for which a report is to be generated. Shown in FIG. 4 is a preferred embodiment menu from which to choose the option of specifying a particular patient. A user may select the "choose patient from list" option 51 from the menu. As a result of such a selection, preferred computer device 10 will display another menu from which to choose a particular patient for generating a report. After the user selects a particular patient from the menu, the user typically will select a "single report" option 53 from the menu to designate a particular report document which is to be generated for this particular patient. Upon selection of "single report" option 53, a window including a menu of possible document structures 22 which can be used to generate a document considering this patient preferably will be shown. A user then typically will select the particular document structure 22 which is to be used in conjunction with the selected patient. Subsequently, a document structure may be shown on electronic display 14 for review by user. Data processor 16 preferably will prompt the user to select particular option-text segments within option-text fields in a particular document structure 22. An example of such a document structure 22' is shown in FIG. 5, and an associated example option-text field 60 is shown in FIG. 6. Data processor 16 typically will prompt the user to select one of the option-text segments within the option-text field 60 before allowing the user to generate a report.

Figure 10:
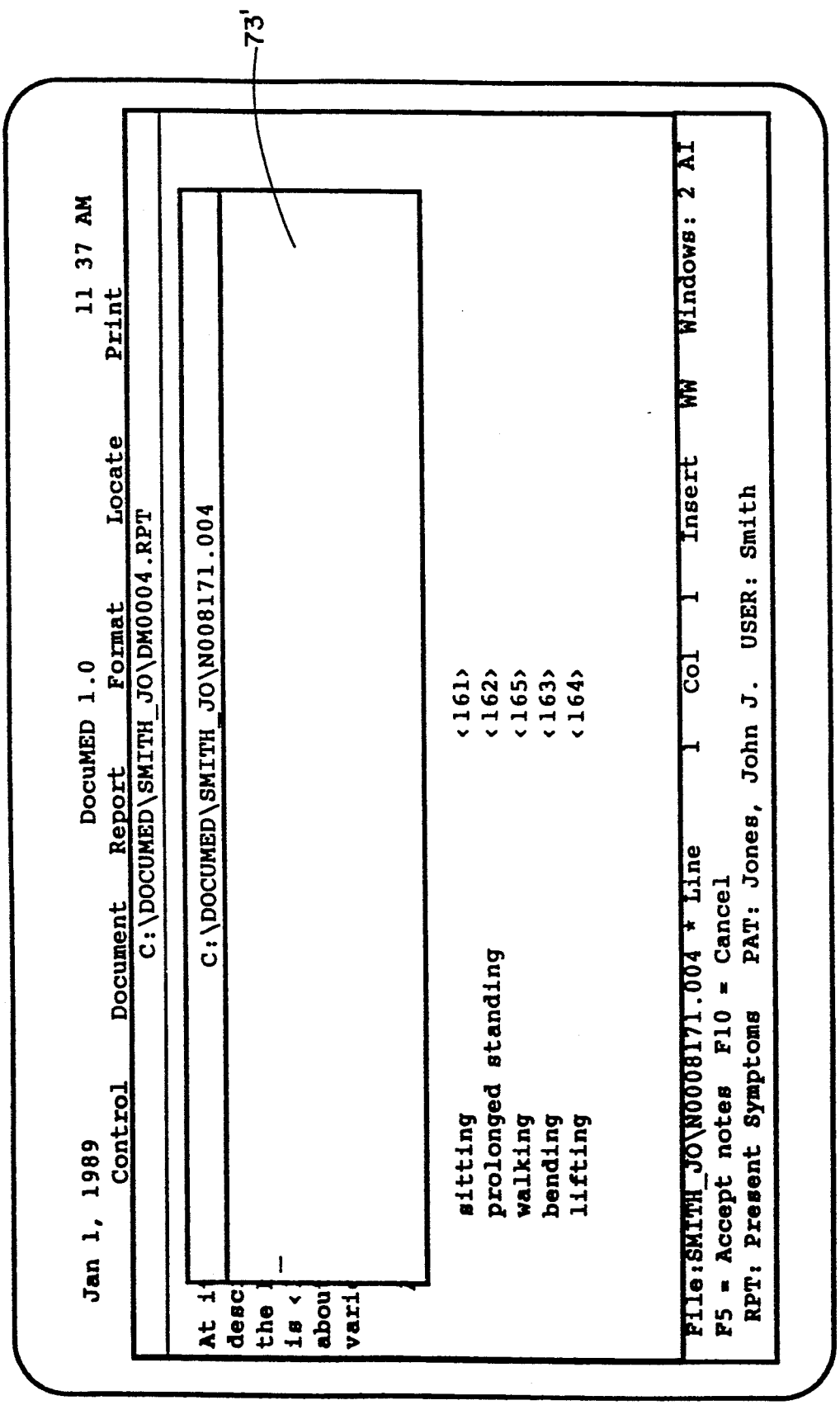
FIG. 10 is a drawing showing an alternative preferred embodiment example of selecting an option-text segment comprising a user-definable text-note and subsequently the automatic activation of a multiple line editing mode so that multiple lines of customized text can be entered into the database.

FIG. 9 is a drawing showing a preferred embodiment example of selecting an option-text expression comprising a pointer 71 to a user-definable text note 73 and subsequently the automatic activation of a single line editing mode so that a single line of customized text can be entered into the selection data 38 for subsequent use in generating a document derived from the selection data 38. A user may select a pointer 71 linked to an option-text note 73 to customize a report for a particular situation when, for example, the option-text segments within an option-text field are not appropriate for a particular situation or when a user desires to add additional information into the report at that particular point. Alternatively, a user could select a pointer linked to an option-text note 73' shown in FIG. 10, which provides multiple line editing capabilities so that multiple lines of text can be entered into the selection data 38.

After a user has selected option-text expressions within all of the option-text fields pointed at by option-text pointers within a document structure 22, the user can electronically store this selection data in electronic storage device 20. Upon storing the selection data in electronic storage device 20, a time/date stamp 28 typically is added to the selection data 38 so that the particular set of selection data can be identified at a later time.

Figure 12:
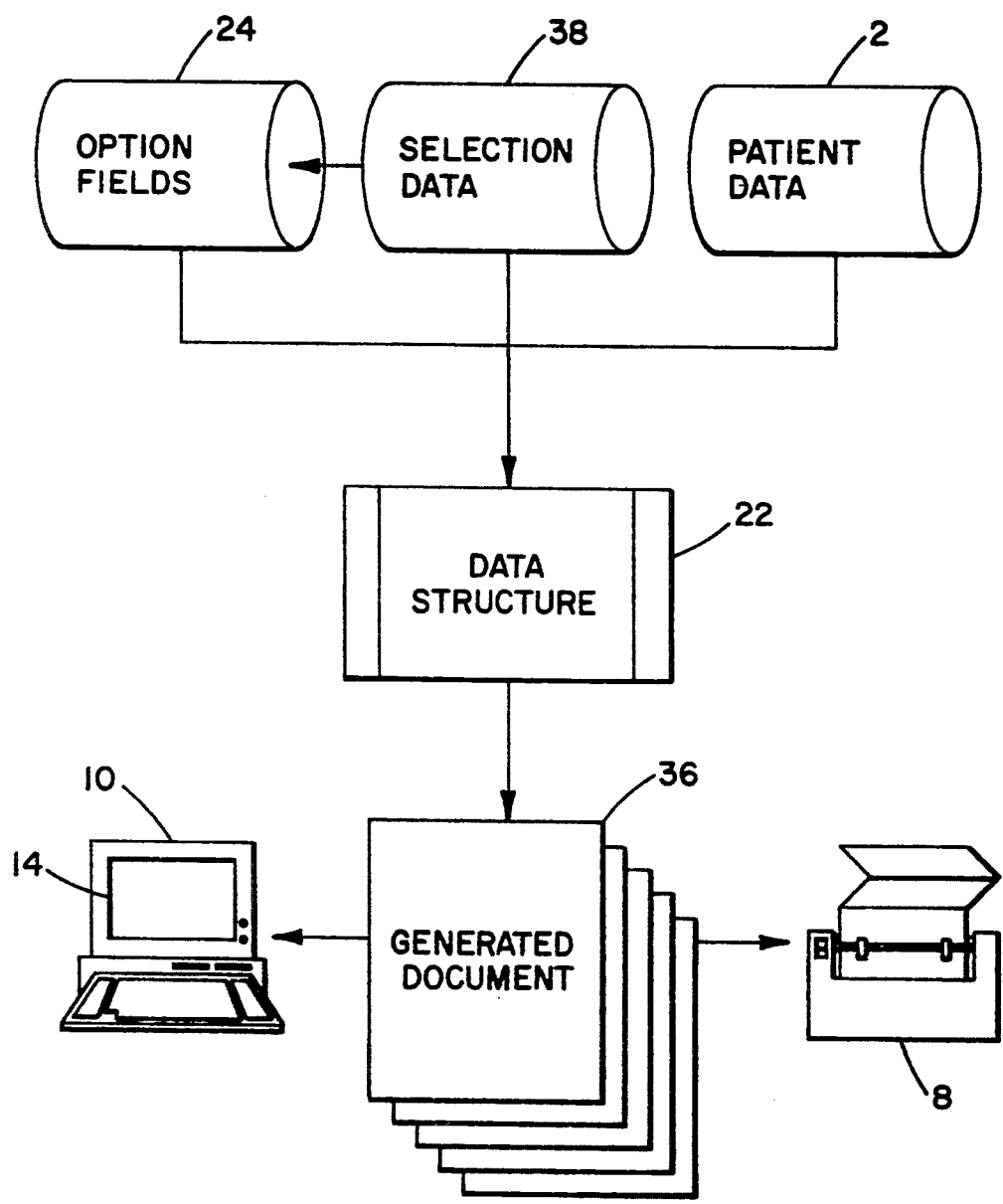
FIG. 12 is a diagram showing a preferred embodiment procedure for generating a document.

In addition, a user may choose to generate a document. Shown in FIG. 12 is a diagram showing a preferred embodiment procedure for generating a document. A typical generated document 36 is derived from a data structure 22 in combination with option list 24, selection data 38 and patient data 32. Data preferably is inserted into data structure 22 at the points in which option-text field pointers point to particular data. In particular, option-text field pointers which point to patient data may become the actual patient data in a generated document. Further, selections of particular option-text segments within option fields 24 may be used to determine which option-text segments are to be inserted into data structure 22 to form generated document 36. Furthermore, selection data 38 comprising text notes typically are inserted into data structure 22 at the appropriate points to form a generated document 36. After generating a document 36, document generation system 1 can display a generated document on the electronic display 14 of computing device 10 and/or output the generated document to printer 8.

Figure 11:
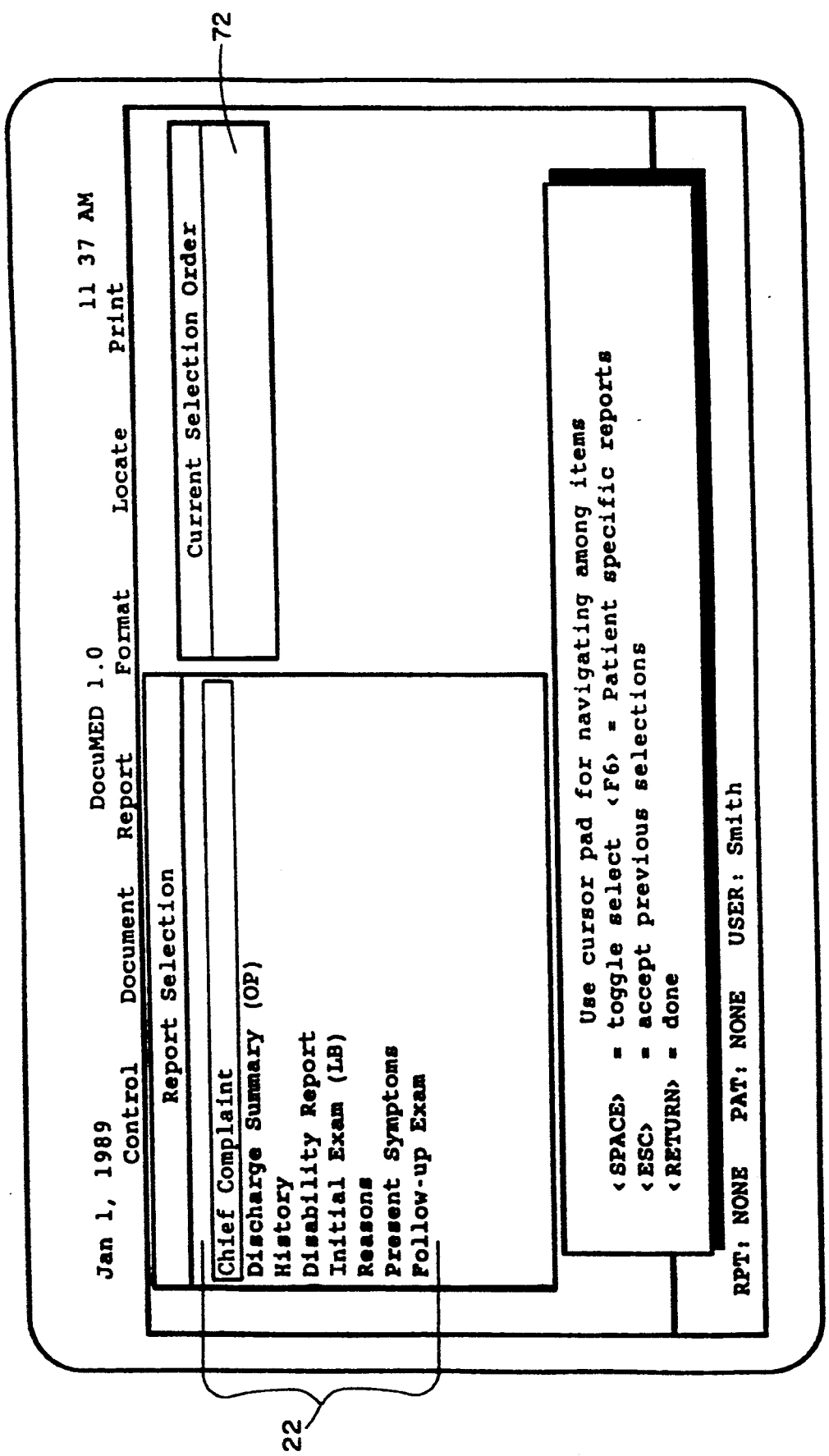
FIG. 11 is a drawing showing an alternative preferred embodiment example of selecting several previously defined document structures to form a new document structure.

FIG. 11 is a drawing showing an alternative preferred embodiment example of selecting several previously defined document structures 22 to form a new document structure 72. It may be desirable to generate a complete patient report including several separate reports. For instance, a complete patient report document might include a report document structure 22 for "an initial visit," "lab results," and "follow-up" for ease of data entry and subsequent document generation these separate document structures 22 may be combined into a single document structure 72. As a result, a plurality of different multiple document structure definitions 72 may be generated for specific needs. Shown in FIG. 11, multiple document structure definitions 72 normally will include several document structure definitions 22. A user can define the order in which each document structure 22 will appear in multiple document structure definition 72. After a user has selected each of these desired document structures 22 in a particular order, a multiple document structure definition 72 preferably can be stored on electronic storage device 20. Subsequently, multiple document storage definition 72 is typically selected by a user for use with a particular patient in a similar manner as was used to select a document structure 22.

In an alternative embodiment, document generation system 1 can generate a checklist document including indicia of option-text segments to be chosen within an option-text field for a particular document structure 22. A printed copy of the checklist document can be utilized by a user to indicate preferred option-text segments to be included in a generated document for a particular patient at a particular time. For example, a user might use a medical check-up checklist document to select or indicate particular information on an office visit by a patient. Such information might include measured weight of the patient during the office visit, new height or weight, symptoms of illness shown by the patient, diagnosis of an illness, and prescribed treatment of the illness. Subsequently, the same or a different user of the documentation generation system may enter the information indicated on the check sheet document to generate a report on the office visit by the patient.

In a further alternative embodiment, the document generation system 1, shown in FIG. 1, further includes a graphics engine 4. The graphics engine 4 is an option preferably provided within the document generation system 1 which allows visual analysis of data stored within the relational database 2 including selection data 38 and patient data 32. Data is displayed on electronic display 14 in various forms within windows on the screen. The forms may include the following graph types:

3-D Bar

Line
Area Fill
Pie
Histogram

The graphics engine 4 allows a user to manipulate a graph in a wide variety of ways. Each data item has its own graphics definition, thereby allowing a mixture of graph types to be displayed simultaneously on the same graph. For example, a graph could contain a line of data overlaying a series of 3-D bars.

Preferred computer device 10 further includes a graphics editing mode of operation in which almost every aspect of a graph can be modified by user, including graph type, color, style, hatching, exploded pie pieces, x-axis and y-axis value ranges as well as number of points. In such an embodiment, the definition of the graph typically is stored by the electronic storage device 20 as an option-graphic image definition.

Preferred document structure 22 further comprises an option-graphic field for electronically storing a plurality of user-definable option-graphic image definitions. Such a computer device 10 typically further includes a selection function for selecting an option-graphic image definition within an option-graphic field. Subsequently, a document may be generated comprising the selected option-graphic image definition.

The document generation system 1 further preferably includes an analysis mode of operation in which data processor 16 can analyze electronically stored indicia of documents (such as data and data pointers from the document creation process) to produce graphs, tables or patient billing reports. The patient billing reports may be based upon selections made within option-text fields within one or more document structures 22 related to a particular patient. For example, a bill could be generated for an office visit by analyzing the time spent with the patient indicated by a selection within an option-text field as well as the diagnosis made and the treatment prescribed. In addition, a brief description of the services provided could be incorporated into the billing document by deriving particular information from the electronic analysis of the selection data corresponding to a particular patient.

Although the present invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the present invention as claimed. For example, the document generation system could be utilized by other professionals such as attorney's, accountants, psychologists, dentists and consultants. Each of these professionals may find significant cost savings and increased efficiency by utilizing a document generation system similar to the previously described preferred embodiments.

What is claimed is:

1. A computer-assisted documentation system for enhancing or replacing the process of dictating and transcribing in the generation of a document, comprising:
   (a) a document database, comprising:
      (i) first database means for processing one or more user-definable document structures to be used as templates for the generation of a document, wherein each document structure is associated with a particular document style, each document structure comprising:
         a) a plurality of phrase fields for electronically storing user-definable phrases;
         b) a plurality of option-text fields; and
         c) field linkage means for linking phrase fields to option-text fields;
      (ii) second database means for accessing option-text lists associated with said option-text fields, wherein each option-text list comprises one or more user-definable option-text expressions; and
      (iii) third database means for processing at least one selection data file, wherein each of said selection data fields is associated with a particular document structure and a particular matter identifier and wherein each of said selection data fields comprises pointers to option-text expressions within said option-text lists;
   b) user interface means for manipulating data within the document database, the user interface means comprising:
      (i) display means for displaying a menu of option-text expressions associated with a particular option-text list; and
      (ii) selecting means for selecting preferred option-text expressions from the menu of option-text expressions displayed by the display means, said selecting means comprising selection data interface means for storing, in the selection data file associated with the document structure and matter identifier corresponding to the document to be generated, a pointer associated with each option-text expression selected; and
   (c) document generation means comprising option-text expression control means for generating, as a function of matter identifier, document structure and selection data file, a document in which the selected preferred option-text expressions are inserted into the appropriate option-text fields.

2. The computer-assisted documentation system of claim 1 wherein said selection data file comprises a time/date stamp for distinguishing between separate documents created for a particular patient and user from a single document structure.

3. The computer-assisted documentation system of claim 1 wherein:
   (a) said document database further comprises fourth database means for accessing one or more matter data storage files, each data storage file containing information associated with a particular matter identifier; and
   (b) said document generating means further comprises matter data control means for generating, as a function of the matter identifier, document structure and selection data file, a document in which data associated with a matter identified by said matter identifier is inserted into the appropriate option-text fields.

4. The computer-assisted documentation system of claim 1 wherein said user interface means further comprises first editing means for making user modifications to the contents of said phrase fields and for creating and modifying said option-text expressions.

5. The computer-assisted documentation system of claim 1 wherein said document generation means comprises means for electronically storing the generated document.

6. The computer-assisted documentation system of claim 1 wherein said document database further comprises means for electronically storing a user-definable electronic document structure derived from a plurality of previously defined electronic document structures.

7. The computer-assisted documentation system of claim 1 wherein:
   (a) said display means comprises a printing device which produces a printed checklist document including indicia of option-text expressions; and
   (b) said selecting means further comprises means for entering a representation of option-text expressions selected on the printed checklist document.

8. The computer-assisted documentation system of claim 1 wherein said selecting means further comprises pointing device means including at least one actuator for use in selecting the preferred option-text expression.

9. The computer-assisted documentation system of claim 1 wherein said selecting means further comprises keyboard means including a plurality of actuators for use in selecting the preferred option-text expression.

10. The computer-assisted documentation system of claim 1 wherein said selecting means further comprises bar-code reader means for use in selecting the preferred option-text expression.

11. The computer-assisted documentation system of claim 1 wherein said user interface means further comprises contextual help means for providing instructions on the use of the user interface means.

12. The computer-assisted documentation system of claim 1 wherein said user interface means further comprises data security means for allowing access to electronically stored data only to authorized users.

13. The computer-assisted documentation system of claim 1 wherein said user interface means further comprises means for electronically storing and accessing data on a computer network.

14. The computer-assisted documentation system of claim 1 wherein:
   (a) at least one of said document structures further comprises an option-graphic field;
   (b) said document database further comprises graphics database means for accessing an option-graphic list associated with said option-graphic field, wherein said option-graphic list comprises one or more user-definable option-graphic image definitions;
   (c) said display means comprises means for displaying a menu of option-graphic image definitions associated with said option-graphic field;
   (d) said selecting means comprises means for selecting a preferred user-definable option-graphic image definition from said menu of option-graphic image definitions displayed by the display means; and
   (e) said document generation means comprises means for generating a document comprising a graphic image derived from the selected user-definable option-graphic image definition.

15. The computer-assisted documentation system of claim 14 wherein said user interface means further comprises first editing means for making user modifications to the user-definable option-graphic image definition.

16. The computer-assisted documentation system of claim 1 wherein said document generation means comprises analyzing means for generating an analysis of option-text expression data including option-text expressions and pointers to option-text expressions and for generating an analysis document comprising information related to said analysis.

17. The computer-assisted documentation system of claim 1 wherein said option-text expressions include user-definable option-text segments comprising predefined character strings which may be retrieved by accessing a particular option-text segment address.

18. The computer-assisted documentation system of claim 17 wherein said selection data interface means comprises means for creating a pointer associated with the option-text segment address of a selected option-text segment.

19. The computer-assisted documentation system of claim 17 wherein said user interface means further comprises first editing means for making user modifications to the contents of the phrase fields and for creating and modifying option-text segments.

20. The computer-assisted documentation system of claim 19 wherein said option-text expressions further include a user-definable option-text note which can be retrieved by accessing a particular option-text note address, wherein:
   (a) said option-text note comprises a character string defined during selection of the preferred option-text expression;
   (b) said menu of option-text expressions displayed by the display means comprises means for indicating selection of an option-text note; and
   (c) said user interface further comprises second editing means for creating and modifying option-text notes.

21. The computer-assisted documentation system of claim 20 wherein said selection data interface means further comprises means for creating a pointer associated with the option-text note address of the selected option-text note.

22. The computer-assisted documentation system of claim 20 wherein said selecting means further comprises means for automatically activating the second editing means in response to selecting an option-text note, whereby an option-text note can be created for the document to be generated.

23. The computer-assisted documentation system of claim 20 wherein said selecting means further comprises means for selecting a plurality of option-text expressions including one or more option-text segments and one or more option-text notes from the menu of option-text expressions displayed by the display means.

24. The computer-assisted documentation system of claim 16 wherein said analyzing means further comprises means for generating a graphic image derived from said analysis.

25. The computer-assisted documentation system of claim 16 wherein said analyzing means further comprises billing means for generating a billing document for services rendered based on said analysis.

26. A computer-based method of generating a document, comprising:
   (a) providing a document structure including a phrase field linked to an option-text field;
   (b) providing an option-text list associated with said option-text field, wherein said option-text list comprises a plurality of option-text segments including a first option-text segment;
   (c) providing a database structure relating a plurality of selection data files to particular document structures and particular matter identifiers; and (d) providing user interface means for selecting an option-text segment, the user interface means comprising:
  (i) display means for displaying a menu of items; and
  (ii) selection means for selecting one or more of the items displayed on the display means;
(e) displaying a menu of items representative of said plurality of option-text segments, wherein said menu comprises a first menu item associated with said first option-text segment;
(d) storing, to one of a plurality of selection data files and in response to the selection of said first menu item, a first pointer associated with said option-text field and said first option-text segment; and
(e) generating a document in which said first option-text segment is inserted into said option-text field.

27. The method of claim 26 wherein the step of providing user interface means comprises:
  (a) providing printing means for printing a checklist document including indicia of each of said menu items; and
  (b) providing a means of indicating a preferred menu item on said checklist document.

28. The method according to claim 26 wherein the step of generating a document comprises:
  (a) determining a document structure and a matter identifier;
  (b) retrieving a selection data file associated with said document structure and said matter identifier;
  (c) accessing a pointer within said selection data file associated with an option-text field within said document structure;
  (d) accessing an option-text segment associated with said pointer; and
  (e) inserting said option-text segment in said option-text field.

29. The method according to claim 26 wherein the step of providing user interface means further includes providing editing means for making user modifications to the phrase field and the option-text segments.

30. The method according to claim 29 wherein the step of providing editing means for making user modifications to the phrase field and the option-text segments includes providing option-text segment entry means for adding user-defined option-text segments to the plurality of option-text segments.

31. The method according to claim 29 wherein the step of providing editing means for making user modifications to the phrase field and the option-text segments includes providing option-text note entry means for providing an option-text note.

* * * * *

UNITED STATES PATENT AND TRADEMARK OFFICE
CERTIFICATE OF CORRECTION

PATENT NO. : 5,148,366
DATED : September 15, 1992
INVENTOR(S) : Buchanan et al.

It is certified that error appears in the above-identified patent and that said Letters Patent is hereby corrected as shown below:

In Column 10, line 14, please change "fields" to --files--.

In Column 10, line 16, please change "fields" to --files--.

In Column 12, line 6, please change "may" to --can--.

Signed and Sealed this

Sixteenth Day of November, 1993

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,148,366 C1  
APPLICATION NO. : 90/010670  
DATED : June 7, 2011  
INVENTOR(S) : Ken Buchanan et al.

Page 1 of 1

It is certified that error appears in the above-identified patent and that said Letters Patent is hereby corrected as shown below:

Title Page 2, Item (56)  
Line 32: after "No. 5;" insert -- 1988 --; and  
Line 57: change "1989" to --1999 --.

Title Page 3, Item (56)  
Line 9: change "22-23" to -- 22-33 --; and  
Line 17: change "Jam" to -- Jan --.

Title Page 5, Item (56)  
Line 29: change "Patial" to -- Partial --; and  
Line 46: after "Clinical" insert -- Data --.

Title Page 6, Item (56)  
Line 14: before "Analysis" insert -- and --;  
Line 19: change "Automted" to -- Automated --;  
Line 57: change "Suppot" to -- Support --; and  
Line 59: change "Records" to -- Record --.

Title Page 6, Item (56)  
Column 2, line 38: change "Ziestorff" to -- Zielstorff --.

Title Page 7, Item (56)  
Line 25: change "Coumbia" to -- Columbia --; and  
Line 28: change "Human-Conputer" to -- Human-Computer --.

Signed and Sealed this  
Twenty-fourth Day of April, 2012

David J. Kappos  
*Director of the United States Patent and Trademark Office*

(12) EX PARTE REEXAMINATION CERTIFICATE (8292nd)

United States Patent
Buchanan et al.

(10) Number: US 5,148,366 C1
(45) Certificate Issued: Jun. 7, 2011

(54) COMPUTER-ASSISTED DOCUMENTATION SYSTEM FOR ENHANCING OR REPLACING THE PROCESS OF DICTATING AND TRANSCRIBING

(75) Inventors: Ken Buchanan, Eagan, MN (US); John A. Dowdle, St. Paul, MN (US)

(73) Assignee: I-Think, L.L.C., Ann Arbor, MI (US)

Reexamination Request:
No. 90/009,196, Jun. 23, 2008
No. 90/010,670, Sep. 10, 2009

Reexamination Certificate for:
Patent No.: 5,148,366
Issued: Sep. 15, 1992
Appl. No.: 07/422,139
Filed: Oct. 16, 1989

Certificate of Correction issued Nov. 16, 1993.

(51) Int. Cl.
*G06F 17/27* (2006.01)
*G06F 17/24* (2006.01)

(52) U.S. Cl. .................................. 715/234; 707/999.009
(58) Field of Classification Search ........................ None
See application file for complete search history.

(56) References Cited

U.S. PATENT DOCUMENTS

| | | | |
|---|---|---|---|
| 3,872,462 A | 3/1975 | Lemelson | |
| 3,934,226 A | 1/1976 | Stone et al. | |
| 4,347,568 A | 8/1982 | Giguere et al. | |
| 4,348,744 A | 9/1982 | White | |
| 4,370,707 A | 1/1983 | Phillips et al. | |
| 4,429,372 A | 1/1984 | Berry et al. | |
| 4,445,795 A | 5/1984 | Levine et al. | |
| 4,454,576 A | 6/1984 | McInroy et al. | |
| 4,491,725 A | 1/1985 | Pritchard | |
| 4,553,860 A | 11/1985 | Imaizumi et al. | |
| 4,559,598 A | 12/1985 | Goldwasser et al. | |
| 4,591,974 A | 5/1986 | Dornbush et al. | |
| 4,608,662 A | 8/1986 | Watanabe et al. | |
| 4,633,430 A | 12/1986 | Cooper | |
| 4,674,040 A | 6/1987 | Barker et al. | |
| 4,674,043 A | 6/1987 | Hernandez et al. | |
| 4,713,754 A | 12/1987 | Agarwal et al. | |
| 4,730,252 A | 3/1988 | Bradshaw | |
| 4,794,386 A | 12/1988 | Bedrij et al. | |
| 4,809,220 A | 2/1989 | Carlson et al. | |
| 4,815,029 A | 3/1989 | Barker et al. | |

(Continued)

FOREIGN PATENT DOCUMENTS

| | | |
|---|---|---|
| EP | 0 338 770 A2 | 10/1989 |
| JP | 02-042561 | 2/1990 |
| WO | WO 82/00726 A1 | 3/1982 |
| WO | WO 90/04227 A1 | 4/1990 |
| WO | WO 91/08538 A1 | 6/1991 |

OTHER PUBLICATIONS

Annson Systems and IBM Corporation, "IBM Solution Pac Doctor's Office Management Book 2: Reference", First Edition (Dec. 1985), pp. 464.

(Continued)

*Primary Examiner* — James Menefee

(57) ABSTRACT

A document generation system is provided for enhancing or replacing the dictation and transcription process. More particularly, a computer-based documentation system utilizing a document structure manipulated by a user interface is provided. The document structure or "boiler plate" includes phrase fields containing user-definable phrases and option-text fields. The option-text fields include a plurality of option-text segments. Through the use of the user interface, desired modifications to the user-modifiable phrases and option-text segments can be accomplished. The user interface further enables selecting of at least one option-text segment from within an option-text field. Subsequently, the system generates a document comprising at least one user-definable phrase and at least one selected option-text segment.

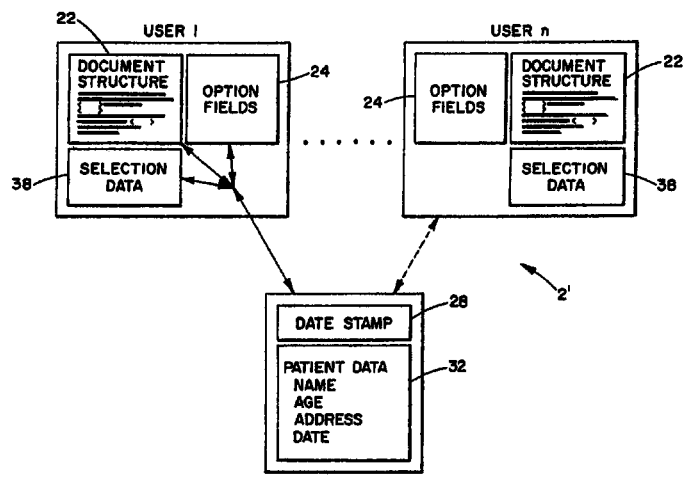

U.S. PATENT DOCUMENTS

| | | | |
|---|---|---|---|
| 4,827,462 | A | 5/1989 | Flannagan et al. |
| 4,835,690 | A | 5/1989 | Gangarosa et al. |
| 4,839,822 | A | 6/1989 | Dormond et al. |
| 4,878,175 | A | 10/1989 | Norden-Paul et al. |
| 4,939,689 | A | 7/1990 | Davis et al. |
| 4,959,769 | A | 9/1990 | Cooper |
| 4,962,475 | A | 10/1990 | Hernandez |
| 4,991,091 | A | 2/1991 | Allen |
| 5,043,891 | A | 8/1991 | Goldstein et al. |
| 5,077,666 | A | 12/1991 | Brimm et al. |
| 5,146,439 | A | 9/1992 | Jachmann et al. |
| 5,200,893 | A | 4/1993 | Ozawa et al. |
| 5,267,155 | A | 11/1993 | Buchanan et al. |
| 5,290,109 | A | 3/1994 | Midorikawa |
| 5,893,914 | A | 4/1999 | Clapp |

OTHER PUBLICATIONS

Anderson, John; "King's College Hospital Computer System (London);" Hospital Computer Systems, Chapter Sixteen; 1974; pp. 457–516.

Annson Systems and IBM Corp.; "IBM Solution Pac Doctor's Office Management Book 2: Reference;" 1st ed.; Dec. 1985; 464 pages.

Ash, Stephen R., M.D., F.A.C.P., et al.; "Portable and Desktop Microcomputers for Patient Care Charting;" Journal of Medical Systems, vol. 10, No. 4, 1986; pp. 361–373.

Barnett, G. Octo M.D.; "The Application of Computer–Based Medical–Record Systems in Ambulatory Practice;" The New England Journal of Medicine, vol. 310, No. 25; Jun. 1984; pp. 1643–1650.

Barnett, G. Octo, M.D., et al.; "COSTAR System;" Information Systems for Patient Care, Chapter 19; 1984; pp. 270–291.

Blois, Marsden S., M.D., Ph.D.; "The Physician's Personal Workstation;" M.D. Computing vol. 2, No. 5; 1985; pp. 22–26.

Brickman, David M., et al.; "Medical Computing, Realities for the Private Practitioner;" Information Systems for Patient Care, Chapter 27; 1984; pp. 348–353.

Cimino, James J., M.D., et al.; "The Physician's Workstation: Recording a Physical Examination Using a Controlled Vocabulary;" Proc. Annu. Symp. Comput. Appl. Med Care; Nov. 4, 1987; pp. 287–291.

Cushing, Matthew, Jr., M.D.; "Doctor's Office Manager: An IBM Billing Package;" M.D. Computing, vol. 2, No. 3; 1985; pp. 23–30.

Fiddleman, Richard H.; "Proliferation of COSTAR—A Status Report;" Information Systems for Patient Care, Chapter 21; 1984; pp. 301–307.

Forward, Daniel J., M.D.; "A Computer–Assisted Problem–Oriented Medical Record System for Office Use;" Information Systems for Patient Care, Chapter 25; 1984; pp. 330–337.

Gerlach, R.J. et al.; "System for Simplified Form Fill–in Using CRT Display;" *IBM Technical Disclosure Bulletin*, vol. 21, No. 11; Apr. 1979; (Armonk, New York, U.S.); pp. 4323–4329.

Hammond, W. E., Ph.D., et al.; "Data Base Management System for Ambulatory Care;" Information Systems for Patient Care, Chapter 15; 1984; pp. 218–231.

Hammond, W. et al.; "The Evolution of a Computerized Medical Information System;" Duke University Medical Center; 1986; pp. 147–156.

Harr, Henry; "ABF: An Expert System for Office Automation and an Interpreter for Legal Document Construction;" Ph.D. Thesis, Illinois Institute of Technology, Aug. 1987; 158 pages.

Hucko et al.; "An Interactive Patient Record System and Its Transfer from a mainframe to Microcomputers;" Proceedings of the Second Annual Symposium on Computer Applications in Medical Care, Nov. 5–9, 1978, pp. 509–516.

"Introduction to Medical Informatics;" http://www.cpmc.columbia.edu/edu/textbook; Sep. 22, 1997; 4 pages.

Jelovsek, Frederick R., M.D., et al.; "Impact of an On–Line Information System in the Medical Office;" Information Systems for Patient Care, Chapter 24; 1984; pp. 322–329.

Jennings, David P. D.V.M, Ph.D., et al.; "Using a Hypercard Workstation to Interface with a Costar Data Base;" Proceedings of the Twelfth Annual Symposium on Computer Applications in Medical Care; Nov. 6–9, 1988; 2 cover pages and pp. 445–447.

Kerlin, Barbara D. Ph.D.; "User Satisfaction with COSTAR V;" Information Systems for Patient Care, Chapter 20; 1984; pp. 293–300.

Korpman; "Patient Care Information Systems: Looking to the Future;" *Software In Health Care;* 1985; 7 pages.

Kuhn, Ingeborg M., Ph.D., et al.; "Automated Ambulatory Medical Record Systems in the US;" Information Systems for Patient Care, Chapter 14; 1984; 3 cover sheets and pp. 199–217.

McColligan, Elizabeth E. M.S., M.P.H.; "Core Record System;" Information Systems for Patient Care, Chapter 18; 1984; pp. 260–269.

McDonald, Clement J. M.D.; "Computer–Stored Medical Record Systems;" Editorial, M.D. Computing vol. 5, No. 5; pp. 4–5 (6 pages; pp. 3–7 plus 1 page).

McDonald, Clement J., M.D., et al.; "The Medical Gopher—A Microcomputer System to Help Find, Organize and Decide About Patient Data;" West J. Med. 145(6), Dec. 1986; pp. 823–829.

McDonald, Clement, M.D.; "Regenstrief Medical Record System;" Information Systems for Patient Care, Chapter 16; 1984; pp. 232–248.

McDonald, Clement J. M.D.; "The Regenstrief Medical Records;" M.D. Computing vol. 5, No. 5; 1988; pp. 34–47.

McDonald, M.D., Clement J., et al.; "The Regenstrief Medical Record System: a quarter century experience;" International Journal of Medical Informatics, vol. 54; 1999; pp. 225–253.

McLatchey, John et al.; "The Capturing of More Detailed Medical Information in Costar," The Seventh Annual Symposium on Computer Applications in Medical Care; Oct. 23–26, 1983; 2 cover pages and pp. 329–332.

Mowry, Michelle; "Evaluating Automated Information Systems and Automated Information Systems in Quality Assurance;" Nursing Economics, vol. 5, No. 1; Jan./Feb. 1987; pp. 7–12.

Murphy, Shawn, N., MD, Ph.D., et al.; "Optimizing Healthcare Research Data Warehouse Design through Past COSTAR Query Analysis;" Proc. AMIA Symp.; 1989; 892–896 (5 pages).

Osburn, A. Eugene, D.O., et al.; "Enhancement to COSTAR;" Information Systems for Patient Care, Chapter 23; 1984; pp. 314–321.

Pascal, Fabian; "A Brave New World? Exploit the relational power and the graphical, multitasking, and connectivity facilities of the new database environments;" BYTE Magazine, vol. 14, Issue 9; Sep. 1989; pp. 247–250.

Principi, Eugene G.; "Better Care, Shorter Stays, Thanks to Networking;" *Data Communications,* Nov. 1986; pp. 189–194 and 197–198.

Pryor, T. A., Ph.D.; "The Help Medical Record System;" M.D. Computing, vol. 5, No. 5; 1988; pp. 22–23.

Pryor, T. A., et al.; "The Help System;" Journal of Medical Systems, vol. 7, No. 2; 1983; pp. 87–102.

Rabbani, Usman, et al.; "A COSTAR Interface Using WWW Technology;" Proc AMIA Symp. 1998; 703–707.

Schlager, David D.; "A Comprehensive Patient Care System for the Family Practice;" Information Systems for Patient Care, Chapter 26; 1984; pp. 338–347.

Schultz, Jam R.; "A History of the PROMIS Technology; An Effective Human Interface;" A History of Personal Workstations, 1988; pp. 1–48.

Shapiro, Alan R., M.D.; "SCAMP System;"Information Systems for Patient Care, Chapter 17; 1984; pp. 249–259.

Shaw, Richard Hale; "SQL: An Emerging Database Standard for PCs;" PC Magazine; May 17, 1988; pp. 275–279.

Slack, Warner V., M.D., et al.; "A Computer–Based Medical History System;" The New England Journal of Medicine 274(4), Jan. 27, 1966; pp. 194–198.

Slack, Warner V., M.D.; "A History of Computerized Medical Interviews;" M.D. Computing vol. 1, No. 5; 1984; pp. 52–59 and 68.

Sprowl, James.; "The ABF Processor: Part I—Primer;" American Bar Foundation; 1978; 118 pages.

Sprowl et al.: "An Expert System for Drafting Legal Documents;" *AFIPS Conference Proceedings,* 1984 National Computer Conference; Jul. 9–12, 1984; AFIPS Press; (Reston, Virginia, U.S.); pp. 667–673.

Sprowl, James A., et al.; "Computerizing Client Services in the Law School Teaching Clinic: An Experiment in Law Office Automation;" American Bar Foundation Res. J.; 1981; pp. 699–752.

Stead, William W. M.D., et al.; "Computer–Based Medical Records: The Centerpiece of TMR;" M.D. Computing, vol. 5, No. 5; 1988; pp. 48–62.

Studney, D.R., M.D., et al.; "A COSTAR Quality Assurance Program in Private Practice;" Information Systems for Patient Care, Chapter 22; 1984; pp. 308–313.

Tang, Paul C., et al.; "Computer–Based Patient–Record Systems;" Medical Informatics: Computer Applications in Health Care and Biomedicine (Health Informatics), Chapter 9; 2000; pp. 335–370.

Whiting–O'Keefe, Quinn E., M.D., et al.; "A Computerized Summary Medical Record System Can Provide More Information Than the Standard Medical Record;" The Journal of the American Medical Association, vol. 254, No. 9; Sep. 6, 1985; pp. 1185–1192.

Whiting–O'Keefe, Q.E., M.D., et al.; "The Stor Clinical Information System;" M.D. Computing, vol. 5, No. 5; 1988; pp. 8–21.

Andrews, Robert D.; "Computer Charting: An Evaluation of a Respiratory Care Computer System;" Respiratory Care; vol. 30, No. 8; Aug. 1985; pp. 695–707.

Armstrong, Carl W., MD; "AHA Guide to Computerized Physician Order–Entry Systems;" American Hospital Association; Nov. 2000; pp. 1–48.

Bana, D.S., et al.; "A Computer–Based Headache Interview: Acceptance by Patients and Physicians;" Headache; vol. 20, No. 2; Mar. 1980; pp. 85–89.

Bana, D.S. et al.; "Use of a Computerized Data Base in a Headache Clinic;" Headache; vol. 21, No. 2; Mar. 1981; pp. 72–74.

Banks, N.J., et al.; "Prompt for COSTAR—A Clinical Reminder System;" Proceedings of the Annual Symposium on Computer Applications in Medical Care; Nov. 1989; pp. 941–942.

Barnett, G.O., et al.; "COSTAR: A Comprehensive Medical Information System for Ambulatory Care;" The Proceedings of the Annual Symposium on Computer Applications in Medical Care; Nov. 1982; pp. 8–18.

Barnett, G.O., et al.; "MUMPS: A Support for Medical Information Systems;" Informatics for Health and Social Care; vol. 1, No. 3; Sep. 1976; pp. 183–189.

Bergeron, et al.; "Intelligent Visual Input: A Graphical Method for Rapid Entry of Patient–Specific Data;" Proceedings of the Annual Symposium on Computer Application in Medical Care; Nov. 1987; pp. 281–286.

Bessen, James, et al.; "Working Paper No. 03–17 An Empirical Look at Software Patents;" Working Papers Research Department; Aug. 2003; 3 cover pages and pp. 1–36.

Bloom, Saul M., et al.; "Converse: A Means to Write, Edit, Administer, and Summarize Computer–Based Dialogue;" Computers and Biomedical Research; vol. 11, No. 2; 1978; pp. 167–175.

Boyd, William E., et al.; "The A–9: A Program for Drafting Security Agreements Under Article 9 of the Uniform Commercial Code;" American Bar Foundation Research Journal; vol. 1981, Winter, No. 1; 1981; 2 cover pages, pp. 571, 637, and 639–669.

Campbell, James, et al.; "Clinic Function and Computerized Ambulatory Records: A Concurrent Study with Conventional Records;" Proceedings of the Annual Symposium on Computer Applications in Medical Care; Nov. 1988; pp. 745–748.

Cannon, Scott R., et al.; "Experience with a Computerized Interactive Protocol System Using HELP;" Computers and Biomedical Research; vol. 13, No. 5; 1980; pp. 399–409.

Chang, M.M., et. al., "The Alcohol Treatment Unit Computerized Medical Record (ATU CMR): A Clinician–Entered Inpatient Record;" Proceedings of the Annual Symposium on Computer Applications in Medical Care; Nov. 9, 1988; 717–721.

Clayton, P.D., et al.; "Data Driven Interpretation of Laboratory Results in the Context of a Medical Decision Support System;" Clinical Biochemistry Principles Methods Applications 2, Data Presentation Interpretation; Chapter 3.7; 1989; 2 cover pages and pp. 367–377.

ComputerTalk; "Directory of Medical Computer Systems;" Spring Edition 1985; 76 pages.

ComputerTalk; "Directory of Medical Computer Systems;" Spring Edition 1986; 60 pages.

ComputerTalk; "Directory of Medical Computer Systems;" Spring Edition 1987; 60 pages.

ComputerTalk; "Directory of Medical Computer Systems;" Spring Edition 1988; 68 pages.

ComputerTalk; "Directory of Medical Computer Systems;" Spring Edition 1989; 56 pages.

Cook, Gordon; "A Medical Revolution That Could . . . : The Work of the Promis Laboratory and Lawrence L. Weed, M.D.;" Sep. 1978; 24 pages.

Cristea, et al.; "Combining Menus with Natural Language Processing in Recording Medical Data;" Journal of Clinical Computing, vol. 16, Issue 5–6; 1988; pp. 156–166.

Cushing, Matthew, Jr., M.D.; "Medical Manager: An Update;" M.D. Computing, vol. 9, No. 1; 1992; pp. 51–53.

Cushing, Matthew, Jr., M.D.; "The Medical Manager, Version 6: An Update;" M.D. Computing, vol. 6, No. 2; 1989; pp. 94–96.

Cushing, Matthew, Jr., M.D.; "Software Review: Medical Manager, An Office Management System;" M.D. Computing, vol. 1, No. 1; 1984; pp. 31–35.

Dambro, Mark R., et al.; "Assessing the Quality of Data Entry in a Computerized Medical Records System;" Journal of Medical Systems; vol. 12, No. 3; Jun. 1988; pp. 181–187.

Dambro, Mark R., et al.; "Tracking Patients: Application of the COSTAR System;" Arizona Medicine; vol. XLI, No. 9; Sep. 1984; pp. 617–618.

Dambro, Mark R., et al.; "An Unsuccessful Experience with Computerized Medical Records in an Academic Medical Center;" Journal of Medical Education; vol. 63, No. 8; Aug. 1988; pp. 617–623.

Datapro; "Excerpts from . . . A Datapro Feature Report—Word Processing Systems User Ratings;" undated; 8 pages.

Dictaphone; "Contract No. GS–OOC–02485;" Oct. 1, 1980–Sep. 30, 1981; 56 pages.

Dictaphone; "Contract No. GS–OOC–03429;" Oct. 1, 1982–Sep. 30, 1983; 58 pages.

Dictaphone; "Dictaphone Reports 45% Increase in its Worldwide Word Processing Sales in 1982;" Press Release: CR–001–1/83; Jan. 1983; 2 pages.

Dictaphone; "Dictaphone System 6000;" WP11–379–301 Word Processing Systems; Jul. 1983; 9 pages.

Dictaphone; "The Dictaphone System 6000;" 13 pages.

Dictaphone; "Dual Display Information Processing;" Feb. 1982; 4 pages.

Dictaphone; "Dual Display—Prompts, A Quick Reference Guide to the Dual Display;" May 1981; 71 pages.

Dictaphone; "Dual Display Word Processing System;" 5 pages.

Dictaphone; "Enhancements to System 6000 Word Processor Announced by Dictaphone;" Press Release: PR–009–6/83; Jun. 1983; 2 pages.

Dictaphone; "Legal Management System Brochure;" Feb. 1983; 7 pages.

Dictaphone; "Legal Management System Manual;" 192 pages.

Dictaphone; "System 6000—The Dictaphone Integrated Office System with Natural Language Accessibility;" Mar. 1983; 5 pages.

"Document Modeler;" The Model Office Company; 1985; 262 pages.

Dudeck, J., et al.; "The HELP—System in a European Environment;" Towards New Hospital Information Systems; 1988; 5 cover pages, pp. 105–110, and back cover.

Ehrenhaft, Pony M., et al.; "Policy Implications of Medical Information Systems;" Dec. 1977; 76 pages.

Eidelman, James A.; "The Computer as Electronic Form Book;" Legal Economics; vol. 14, No. 4; May/Jun. 1988; pp. 3 and 45–59.

Farrell, et al.; "Applying Structured Tools and Techniques to the Development of Software for a Small Computer System;" Proceedings of the 1981 ACM SIGSMALL Symposium on Small Systems and SIGMOD Workshop on Small Database Systems; 1981; pp. 1–8.

Farrel, Donald L., et al.; "Implementation of a Computer–Assisted Medical Record System in the Family Practice Office;" Hawaii Medical Journal; vol. 41, No. 3; Mar. 1982; pp. 90–93.

Fiddleman, Richard H.; "Who Uses COSTAR and Why;" Proceedings of the Annual Symposium on Computer Applications in Medical Care; Nov. 1981; pp. 88–90.

Forward, Daniel J.; "Development of a Computer–Assisted Problem–Oriented Medical Record System for Office Use;" Proceedings of the Annual Symposium on Computer Applications in Medical Care; Nov. 1981; pp. 104–110.

"Functional Specification of a PROMIS instance System;" vols. 1 and 2; Vermont University; Dec. 1980; 703 pages.

Gardner, Reed M.; "Computerized Data Management and Decision Making in Critical Care;" Surgical Clinics of North America; vol. 65, No. 4; Aug. 1985; pp. 1041–1051.

Glaser, John P., et al.; "A Very Large PC LAN as the Basis for a Hospital Information System;" Journal of Medical Systems, vol. 15, No. 2; Apr. 1991; pp. 133–137.

Gould, et al.; "Composing Letters with a Simulated Listening Typewriter;" Communications of the ACM; vol. 26, No. 4; Apr. 1983; pp. 295–308.

Haessler, Herbert A., et al., "Evolution of an Automated Database History;" Archives of Internal Medicine; vol. 134; Sep. 1974; pp. 586–591.

Hagamen, W., et al., "Medical Applications of Data–Driven APL Programs;" Proceedings of Seventh International Conference on APL, 1975; pp. 158–165.

Hagamen, W., et. al., "A Program Generator;" IBM Systems Journal; vol. 14, No. 2; 1975; 2 cover pages and pp. 102–133.

Hammond, Kendric W., et al.; "A Computerized Psychiatric Treatment Planning System;" Hospital and Community Psychiatry; vol. 35, No. 2; Feb. 1984; pp. 160–163.

Hammond, Kendric W., et al.; "GRAMPS: An Automated Ambulatory Geriatric Record;" Proceedings of the Annual Symposium on Computer Applications in Medical Care; Nov. 1988; pp. 708–712.

Hammond, Kendric W., et al.; "A Provider–Interactive Medical Record System Can Favorably Influence Costs and Quality of Medical Care;" Computers in Biology and Medicine; vol. 20, No. 4; 1990; pp. 267–279.

Hammond, W. et al.; "Standards in Medical Informatics;" Medical Informatics Computer Applications in Health Care and Biomedicine; Chapter 6 in EH Shortliffe, LE Perreault, G Wiederhold, LM Fagan, eds. Medical Informatics: Computer Applications in Health Care and Biomedicine. New York: Springer, pp. 226–276; 2000.

Hammond, Kenric W., et al.; "Structured Integration of Narrative Medical Data Bases;" Mug Quarterly; vol. XIX, No. I; 1989; pp. 49–54.

Hammond, Kenric W., et al.; "Structured Text Management in an Outpatient Medical Record System;" Proceedings of the American Association for Medical Systems and Informatics; AAMSI Congress, vol. 5; May 14, 1987; 2 cover pages and pp. 73–77.

Haug, Peter J., et al.; "A Decision–Driven System to Collect the Patient History;" Computers and Biomedical Research; vol. 20, No. 2; Apr. 1987; pp. 193 and 195–207.

Humphreys, Betsy L., et al.; "Building the United Medical Language System;" Proceedings of the Thirteenth Annual Symposium on Computer Applications in Medical Care; IEEE Computer Society Press; 1989; pp. 475–480.

Jordan, et al.; "English Output of the Physical Examination in an Automated Medical Record;" Proceedings of the 1975 ACM Annual Conference; 1975; pp. 59–63.

Kukich, Karen; "Knowledge–Based Report Generation: A Technique for Automatically Generating Natural Language Reports from Databases;" Proceedings of the 6th annual international ACM SIGIR conference on Research and Development in Information Retrieval; Session 11: Numerical Databases; 1983; pp. 246–250.

Kuperman, Gilad J., et al.; "The HELP System A Snapshot in Time;" Department of Biophysics, LDS Hospital, Salt Lake City, Utah, Sep. 1988; 302 pages.

Larimer, Emily; "Document Maker—Text Management Software for the Mac;" Office Equipment & Methods; May 1986; cover page and pp. 50, 51, and 54.

Lee, Alison, et al.; "Officeaid: An Integrated Document Management System;" Proceedings of the Second ACM–SIGOA Conference on Office Information Systems; Jun. 1984; pp. 170–180.

Locke, S.E., et al.; "Computer–Based Interview for Screening Blood Donors for Risk of HIV Transmission;" Proceedings of the Annual Symposium on Computer Applications in Medical Care; Nov. 1990; pp. 835–839.

Lodwick, Gwilym S.; "Information Management in Radiology;" Hospital Computer Systems; Chapter 9; 1974; pp. 206–240.

Ma, H.–N.N. et al.; "An Intelligent Progress Note System for Medas (A Bayesian Medical Expert System);" Proceedings of the Third Annual IEEE Symposium on Computer–Based Medical Systems; Jun. 1990; pp. 484–491.

Malone, et al.; "The Information Lens: An Intelligent System for Information Sharing in Organizations;" Proceedings of the SIGCHI Conference on Human Factors in Computing Systems; Apr. 1986; pp. 1–8.

Malone, et al.; "Intelligent Information–Sharing Systems;" Communications of the ACM; vol. 30, No. 5; May 1987; pp. 390–402.

Malone, et al.; "Semistructured Messages Are Surprisingly Useful for Computer–Supported Coordination;" ACM Transactions on Office Information Systems; vol. 5, No. 2; Apr. 1987; pp. 115–131.

Margolis, Alvaro, et al.; "New Uses of Legacy Systems: Examples in Perinatal Care;" Proceedings of the AMIA Annual Symposium; 1999; pp. 854–858.

Massey, et al.; "A PC–Based Free Text Retrieval System for Health Care Providers;" Journal of Medical Systems; vol. 11, No. 1; 1987; pp. 69–81.

Maultsby, Maxie C., et al.; "A Computer–Based Psychiatry History System;" Archives of General Psychiatry; vol. 25, Issue 6; Dec. 1971; pp. 570–572.

McDonald, C.J., et al.; "The Benefits of Automated Medical Record Systems for Ambulatory Care;" Proceedings of the Tenth Annual Symposium on Computer Applications in Medical Care; Oct. 1986; cover page and pp. 157–171.

McDonald, Clement J., M.D., et al.; "Data Base Management, Feedback Control and The Regenstrief Medical Record;" Proceedings of the Annual Symposium on Computer Applications in Medical Care; Nov. 1982; pp. 52–60.

McDonald, Clement J., M.D., et al.; "Physicians, Information Technology, and Health Care Systems: A Journey, Not a Destination;" Journal of the American Medical Informatics Association; vol. 11, No. 2; Mar./Apr. 2004; pp. 121–124.

McDonald, Clement J., M.D., et al.; "The Regenstrief Medical Record: 1989 A Campus–Wide System;" Proceedings of the Annual Symposium on Computer Applications in Medical Care; Nov. 1989; pp. 933–936.

McDonald, M.D., Clement J., et al.; "The Regenstrief Medical Record System 1999: Sharing Data Between Hospitals;" 1999; 1 page.

McEachron, Donald L., et al.; "Image Processing for the Rest of Us: The Potential Utility of Inexpensive Computerized Image Analysis in Clinical Pathology and Radiology;" Computerized Medical Imaging and Graphics, vol. 13, No. 1; 1989; pp. 3–30.

McLeod, Dennis J., et al.; "SELECT: An Interactive Minicomputer Subsystem for the Generation of Specialized Narrative Text;" Computers and Biomedical Research; vol. 10; 1977; pp. 91–99.

Medical Documenting Systems; "User's Guide to Documed;" DocuMed Version 1.0; 1989; 103 pages.

Medical Documenting Systems; "DocuMed User's Guide;" DocuMed Version 2.0; 1990; 240 pages.

Molich, Rolf, et al.; "Improving a Human–Computer Dialogue;" Communications of the ACM, vol. 33, No. 3; Mar. 1990; pp. 338–348.

Murchie, et al.; "Comparison of Keyboard, Light Pen and Voice Recognition as Methods of Data Input;" International Journal of Clinical Monitoring and Computing; vol. 5, No. 4; Dec. 1988; pp. 243–246.

Naeymirad, Shon Afshin; "The Portable Patient File: An Intelligent Automated Medical Record;" Submitted in Patial Fulfillment of the Requirements for the Degree of Master of Science in Computer Science in the Lewis College of Science and Letters of Illinois Institute of Technology; Dec. 1988; 4 cover pages and pp. 1–41.

Naeymirad, Shon Afshin; "The Portable Patient File: An Intelligent Automated Medical Record;" The Proceedings of MEDINFO; Jan. 1989; 6 pages.

Nichols, Karen J.; "The Johns Hopkins Hospital Asthma Clinic—An Automated System;" Proceedings of the Annual Symposium on Computer Applications in Medical Care; Nov. 1985; pp. 497–501.

Nichols, Karen J., et al.; "The Johns Hopkins Hospital Discharge Instructions Application;" Proceedings of the Annual Symposium on Computer Applications in Medical Care; Nov. 1987; pp. 401–405.

O'Kane, et al.; "Generalized Protocol Driven Problem Oriented Clinical Management and Monitoring;" Proceedings of the ACM 1980 Annual Conference; 1980; pp. 433–438.

Peckham, Ben M., et al.; "Computerized Data Collection in the Management of Uterine Cancer;" Dysplasia and Carcinoma In Situ of the Cervix; Dec. 1967; 2 cover pages and pp. 1003–1015.

Powell, H., et al.; "Promis in Primary Care Demonstration of a Computerized Problem–Oriented Medical Information System in Primary Care;" Proceedings of the Annual Symposium on Computer Applications in Medical Care; Nov. 1981; pp. 760–764.

Powers, Bernard J.; "A Clinical Research Data Base System for the Apple lle/llc;" Computers in Biology and Medicine; vol. 16, No. 5; Feb. 1986; pp. 391–398.

Pryor, T. A., et al.; "A Distributed Processing System for Patient Management;" Computers in Cardiology; Sep. 1978; pp. 325–328.

Pryor, T. A., et al.; "HELP—A Total Hospital Information System;" Proceedings of the Annual Symposium on Computer Applications in Medical Care; Nov. 1980; pp. 3–7.

Pryor, T. A., et al.; "The HELP System;" Reprinted from Proceedings of the Sixth Annual Symposium on Computer Applications in Medical Care; Oct.–Nov. 1982; pp. 19–27.

Quaak, et al.; "Automation of the Patient History—Evaluation of Ergonomic Aspects;" International Journal of Bio-Medical Computing; vol. 21(3–4); Nov. 1987; pp. 287–298.

Report Generator; "Installation of the Report Generator;" Marked CONFIDENTIAL; Revisions: 2–4; Mar. 28, 1988 through Feb. 5, 1996; pp. 1–29.

Robb, et al.; "A Workstation for Multi–Dimensional Display Analysis of Biomedical Images;" Computer Methods and Programs in Biomedicine; vol. 25, No. 2; 1987; pp. 169–184.

Robinson, III, Robert E.; "Pathology Subsystem;" Hospital Computer Systems; Chapter 8; 1974; pp. 194–205.

Rockart, John F., et al.; "An Automted Medical History System;" Archives of Internal Medicine; vol. 132; Sep. 1973; pp. 348–358.

Safran, Charles, et al.; "Computer–Based Support for Clinical Decision Making;" M.D. Computing; vol. 7, No. 5; Sep.–Oct. 1990; pp. 319–322.

Safran, Charles, et al.; "Management of Information in Integrated Delivery Networks;" Chapter 10; Medical Informatics: Computer Applications in Health Care and Biomedicine; pp. 369–407; 2000.

Saxon, Charles S.; "Computer–aided Drafting of Legal Documents;" American Bar Foundation Research Journal; vol. 1982; No. 3; Summer 1982; 2 cover pages and pp. 685–754.

Saxon, Charles S.; "Computer Aided Drafting of Legal Documents;" A Dissertation Submitted in Partial Fulfillment of the Requirements for the Degree of Doctor of Philosophy in the University of Michigan; 1981; 172 pages.

Schmidt, E.C., et al.; "Computerized Problem–Oriented Medical Record for Ambulatory Practice;" Medical Care; vol. XII, No. 4; Apr. 1974; pp. 316–327.

Schultz, Jan R., et al.; "The Technology of PROMIS;" Proceedings of the IEEE; vol. 67, Issue 9; Sep. 1979; pp. 1237–1244.

Schwartz, M.D., et al.; "Labor and Delivery Information System;" Proceedings of the Ninth Annual Symposium on Computer Applications in Medical Care; Nov. 1985; cover page and pp. 139–143.

Seiver, et al.; "Bedside Computers in the Surgical Intensive Care Unit;" Angiology; vol. 38, No. 3; Mar. 1987; pp. 248–252.

Shabot, M. Michael, et. al.; "Graphical Reports and Displays for Complex ICU Data: A New, Flexible and Configurable Method;" Proceedings of the Annual Symposium on Computer Applications in Medical Care; Nov. 13, 1985; pp. 418–421.

Shahar, Yuval, M.D., Ph.D.; "Computer–Based Patient Records and Medical Informatics Standards;" Medical Decision Suppot Systems; undated; 32 pages.

Simborg, Donald W., et al.; "Summary Time Oriented Records (STOR)—A Progress Report;" Proceedings of the Annual Symposium on Computer Applications in Medical Care; Nov. 1981; pp. 100–103.

Slack, Warner V., et al.; "Computer–Based Patient Interviewing;" Postgraduate Medicine; vol. 43, No. 3; Mar. 1968; pp. 68–74.

Slack, Warner V., M.D., et al.; "A Computer–Based Physical Examination System;" The Journal of the American Medical Association; vol. 200, No. 3; Apr. 1967; pp. 136–140.

Slack, Warner V., et al.; "Patient–Computer Dialogue;" The New England Journal of Medicine; vol. 285, No. 24; Jun. 1972; pp. 1304–1309.

Stead, W.W., et al.; "A Chartless Record—Is it Adequate?" Journal of Medical Systems; vol. 7, No. 2; 1983; pp. 103–109.

Stead, William, et al.; "Demand–Oriented Medical Records: Toward a Physician Work Station;" Proceedings of the Annual Symposium on Computer Application in Medical Care; Nov. 1987; pp. 275–280.

Templeton, Arch W., et al.; "Digital Image Management Networks: Current Status;" Radiology; Oct. 1988; vol. 169, No. 1; 193–199.

Timpka, Toomas; "Introducing Hypertext in Primary Health Care: A Study on the Feasibility of Decision Support for Practitioners;" Computer Methods and Programs in Biomedicine, vol. 29; 1989; pp. 1–13.

Tsichritzis, D.; "Form Management;" Communications of the ACM; vol. 25, No. 7; Jul. 1982; pp. 453–478.

Van Cura, Lawrence J., et al.; "Elements of a Computer Medical Interview System;" Biomedical Sciences Instrumentation, vol. 8; 1971; pp. 33–42.

Walton, Peter L., et al.; "Medical Guidance and PROMIS;" Computer; vol. 12, Issue 11; Nov. 1979; pp. 19–27.

Warner, Homer R., et al.; "A Sequential Bayesean Approach to History Taking and Diagnosis;" Computers and Biomedical Research; vol. 5, No. 3; Jun. 1972; pp. 256–262.

Weed, Lawrence L.; "Computerization of the Medical Record;" Medical Records, Medical Education, and Patient Care; Chapter 10; 1970; pp. 109–122.

Willard, Oliver T.; "Barcodes in a Medical Office Computer System Experience with Eight Million Data Entry Operations;" Proceedings of the Annual Symposium on Computer Applications in Medical Care; Nov. 13, 1985; pp. 72–76.

Ziestorff, R.D., et al.; "A COSTAR–Based Multidisciplinary Record System for Coordination of Long–Term Care for the Elderly;" MUG Quarterly; vol. XVI, No. 4; Sep. 1987; pp. 13–16.

American Health Information Management Association; "Authentication Issues;" prior to Oct. 10, 1993; 4 pages.

American Health Information Management Association; Fax including "Condition of Participation: Medical Records Services, Health Care Financing Administration, 42 CFR, Chapter 4, § 482.24" and miscellaneous state regulations; Jun. 30, 1995; 2 pages.

American Health Information Management Association; Fax of California Statute on Electronic Signatures; "Assembly Bill No. 3163, Chapter 631;" Oct. 5, 1994; cover sheet and 1 page.

American Health Information Management Association, "Language for Model Health Information Legislation on Creation, Authentication and Retention of Computer–Based Health Records;" Draft; Jul. 6, 1994; pp. 1–5.

American Health Information Management Association; "Position Statement;" Sep. 1993; 1 page.

Dahlgren, Jennifer, "Medical Office Management; Easy Documentation; Physician develops software to make documentation faster and more accurate in a medical practice;" Physicians & Computers, Apr. 1993; 6 pages.

Dahlgren, Jennifer; "Medical Software; If you find that filling out patient encounter forms is stealing too much of your time each day, read on. These two physicians found a way to deal with that dilemma;" Physicians & Computers, vol. 8, No. 10; Feb. 1991, 5 pages.
DocuMed, Inc.; "Acquire the Power to Compete in Today's Healthcare Market;" 2000; 2 pages.
DocuMed, Inc.; "DocuMed Electronic Clinical Office;" 2008; 2 pages.
DocuMed, Inc.; "Electronic Medical Records Made Easy;" 2002; 1 page.
DocuMed, Inc.; "Introducing DocuMed 2002;" 1 page.
DocuMed, Inc.; "DocuMed Home Page," www.documed.com; Dec. 28, 1999; 3 pages.
DocuMed, Inc.; "DocuMed Sold;" Feb. 22, 1999; 2 pages.
DocuMed, Inc.; "DocuMed Trial Version 4.3;" 2000; 2 pages.
"Electronic Medical Records—Why Their Time Has Come;" 2003; pp. 1–12.
Feste, Laura K.; "Letter to Paul Schyve, MD regarding auto signature program usage;" Feb. 18, 1993; 3 pages.
Grzybowski, Darice M.; "The Transition from Signature to Authorship;" Journal of AHIMA, vol. 64, No. 9, Sep. 1993; pp. 80–82, 84, 86, 88, and 90.
Hinsdale Hospital; Fax Regarding "Authorization for Use of Electronic Signature Authentication for Dictated Reports;" Jul. 22, 1994; 9 pages.
HotList; "Electronic Medical Records;" Computers in Healthcare; Oct. 1993; pp. 46, 48, 50, 54, 59, and 60.
Huff, Cynthia; "The Bucks Start Here;" Healthcare Informatics; Jun. 2004; pp. 27–30, 32, 34, 36, 38, 40, 44, 46, 48, 50, 52, 54 and 56.
Journal of AHIMA, vol. 64, No. 11; Nov. 1993; pp. 87–89.
McNair, Norman, "Letter to Nick Hernandez regarding Carefile;" Jun. 29, 1992; 2 pages; enclosures include: Carefile brochure, 2 pages; and Carefile Overview, 32 pages (Exhibit 73 from the Deposition of Shawn Dempster).
Medical Documenting Systems, Inc.; "Acquire the Power to Compete in Today's Healthcare Market;" 1996; 2 pages.
Medical Documenting Systems, Inc.; "DocuMed;" Photocopy of Demonstration Diskette Label; 1996; 1 page.
Medical Documenting Systems, Inc.; "DocuMed for Pen;" Photocopy of Base System Installation Version 1.1 Disk; Jun. 5, 1995; 1 page.
Medical Documenting Systems, Inc.; "DocuMed;" Photocopy of Version 2.1 Installation Disks 1 and 2; 1991; 2 pages.
Medical Documenting Systems, Inc.; "DocuMed for Windows;" Photocopy of Version 3.0 Installation Disk # 1 of 3 Label; 1996; 1 page.
Medical Documenting Systems, Inc.; "DocuMed for Windows;" Photocopy of Version 3.0 Disk # 1; 1995; 1 page.
Medical Documenting Systems, Inc.; "DocuMed Version 2.5 StandAlone;" Photocopy of Installation Disk 1 of 3; 1992; 1 page.
Medical Documenting Systems, Inc.; "DocuMed Version 2.5;" Photocopy of Network Installation Diskette; Disk 1 of 3; 1993; 1 page.
Medical Documenting Systems, Inc.; "DocuMed for Windows;" Photocopy of Version 4.0 Installation Disk # 1 of 5; 1996; 1 page.

Medical Documenting Systems, Inc.; "DocuMed for Windows;" Photocopy of MODEMS Program Version 4.0 Installation Disk # 3 of 6; 1996; 1 page.
Medical Documenting Systems, Inc.; "DocuMed for Windows;" Photocopy of Physical Therapy Trial Program Version 4.0 Installation Disk # 1 of 5; 1996; 1 page.
Medical Documenting Systems, Inc.; "DocuMed for Windows;" Photocopy of Version 4.1 Installation Disk # 1 of 6; 1997; 1 page.
Medical Documenting Systems, Inc.; "DocuMed for Windows;" Photocopy of Version 4.2 Installation Disk # 1 of 6; 1997; 1 page.
Medical Documenting Systems, Inc.; "DocuMed—It's About Time;" 1990; 11 pages.
Medical Documenting Systems, Inc.; "Software Licensing Agreement;" 1995; 2 pages.
Medical Documenting Systems, Inc.; "The Total Solution for Automated Medical Records and Outcomes Management . . . ;" 1995; 10 pages.
Medical Documenting Systems, Inc.; "DocuMed Version 4.1 User's Guide;" 1997; 2 pages.
Medical Documenting Systems, Inc.; "Would You Rather Be a Hammer or a Nail?" DocuMed Brochure; 2 pages.
Medical Records; Online Lecture Notes for MDIF G4001 Introduction to Medical Informatics at Coumbia Unversity; http://www.dbmi.columbia.edu/hripcsak/textbook/records.txt; Sep. 1997; 4 pages.
Molich, Rolf, et al.; "Improving a Human–Conputer Dialogue;" Communications of the ACM, vol. 33, No. 3; Mar. 1990; pp. 338–348.
Pryor, T. A., et al.; "A Distributed Processing System for Patient Management;" Computers in Cardiology, Sep. 1978; pp. 325–328.
Rudowski, Betsy; "Using DocuMed, Physicians Can 'Quantify Their Quality;'" Managed Healthcare News, vol. 10, No. 7; Jul. 1994; 2 pages.
Schumann, Michael D., et al.; "New Revisions to China's Patent Law Take Effect;" The International Computer Lawyer; vol. 1, No. 6; May 1993; 1 page.
Stead, William W.; "A New Biennium;" M.D. Computing; vol. 5, No. 5; AAMSI News; cover page, pp. 6–7, plus 1 page.
Stead, William W.; "Systems for the Year 2000; the Case for an Integrated Database;" M.D. Computing, vol. 8, No. 2; 1991; pp. 103, 104, 106, and 108–110.
Tirone, Anthony J.; Memorandum re "Authentication of Medical Records—Clarifying Additional Guidance to Surveyors;" Feb. 9, 1994; 2 pages.
Tirone, Anthony J.; Memorandum re "Auto–authentication of Medical Records;" Mar. 18, 1993; 5 pages.
Wallace, Scott; "The Computerized Patient Record;" BYTE; May 1994; pp. 67, 68, 70, 72, 74, and 75.
Workshop Schedule; Including "New Computerized Medical Record Systems;" Mar. 5, 1992; 1 page.
Zeglen, Margaret; "The Impact of Computer–Key Signatures on Medical Records;" Apr. 1, 1994; 16 pages.
Zupko, Karen A.; "The Very Best Way to Organize Patient Records;" Medical Economics, Jul. 25, 1994; pp. 75–77, 81, 82, and 85.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-31 is confirmed.

* * * * *